US012701354B2

(12) United States Patent
Bernier et al.

(10) Patent No.: US 12,701,354 B2
(45) Date of Patent: Aug. 4, 2026

(54) ACOUSTIC INSERT FOR EARPIECE

(71) Applicant: 3M INNOVATIVE PROPERTIES COMPANY, St. Paul, MN (US)

(72) Inventors: Antoine Bernier, Montreal (CA); Katrin Braun, Montreal (CA); Bernard Daoust, Sutton (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 156 days.

(21) Appl. No.: 18/564,525

(22) PCT Filed: May 27, 2022

(86) PCT No.: PCT/US2022/031407

§ 371 (c)(1),
(2) Date: Nov. 27, 2023

(87) PCT Pub. No.: WO2022/251681

PCT Pub. Date: Dec. 1, 2022

(65) Prior Publication Data

US 2024/0267673 A1 Aug. 8, 2024

Related U.S. Application Data

(60) Provisional application No. 63/227,681, filed on Jul. 30, 2021, provisional application No. 63/194,652, filed on May 28, 2021.

(51) Int. Cl.

| | |
|---|---|
| ***H04R 1/28*** | (2006.01) |
| ***H04R 1/04*** | (2006.01) |
| ***H04R 1/10*** | (2026.01) |

(52) U.S. Cl.

CPC ............... *H04R 1/288* (2013.01); *H04R 1/04* (2013.01); *H04R 1/1016* (2013.01); (Continued)

(58) Field of Classification Search

CPC ........... H04S 3/008; H04S 7/30; H04R 3/001; H04R 5/021; H04R 2420/07

See application file for complete search history.

(56) References Cited

U.S. PATENT DOCUMENTS

| | | | | |
|---|---|---|---|---|
| 8,600,095 B2 * | 12/2013 | Yuen | H04R 1/1041 | 381/87 |
| 8,989,427 B2 * | 3/2015 | Silvestri | H04R 1/1083 | 381/372 |

(Continued)

FOREIGN PATENT DOCUMENTS

| | | |
|---|---|---|
| EP | 3451704 A1 | 3/2019 |

OTHER PUBLICATIONS

International Search Report for PCT Application No. PCT/US2022/031407, mailed on Aug. 31, 2022, 4 pages.

*Primary Examiner* — Duc Nguyen

(74) *Attorney, Agent, or Firm* — Katherine M. Scholz

(57) ABSTRACT

An earpiece includes a shell forming a cavity and a sound channel having a first end connected to and in communication with the cavity, and a second end opposite to the first end, the sound channel forming a single pass-through cavity extending from the first end to the second end; an insert disposed within the cavity; a speaker; a circuit board assembly mounted onto the insert, the circuit board assembly comprising a printed circuit board defining a first side and a second side, and a first microphone disposed on the first side; an acoustic chamber formed between the insert and the circuit board assembly, the first microphone being disposed within the acoustic chamber; and an acoustic channel extending from the acoustic chamber to the sound channel.

17 Claims, 15 Drawing Sheets

(52) U.S. Cl.
CPC ......... *H04R 1/1075* (2013.01); *H04R 1/2888* (2013.01); *H04R 2400/01* (2013.01)

(56) References Cited

U.S. PATENT DOCUMENTS

| | | | | |
|---|---|---|---|---|
| 11,653,161 | B2 * | 5/2023 | Kirchhoff | H04R 25/60 381/328 |
| 2009/0232341 | A1 * | 9/2009 | Pinter | H04R 25/407 381/380 |
| 2010/0254555 | A1 * | 10/2010 | Elmedyb | H04R 25/453 381/318 |
| 2011/0058704 | A1 * | 3/2011 | Harlow | H04R 1/1016 381/380 |
| 2012/0039500 | A1 * | 2/2012 | Silvestri | H04R 1/02 381/380 |
| 2012/0087511 | A1 * | 4/2012 | Lumsden | H04R 1/1083 381/74 |
| 2014/0177892 | A1 * | 6/2014 | van Halteren | H04R 25/48 381/322 |
| 2016/0080872 | A1 * | 3/2016 | Shennib | H04R 25/48 381/328 |
| 2016/0100260 | A1 * | 4/2016 | Ruppersberg | H04R 25/456 381/326 |
| 2017/0223443 | A1 * | 8/2017 | Silvestri | H04R 1/1016 |
| 2020/0178003 | A1 * | 6/2020 | Zurbruegg | H04R 25/604 |
| 2020/0186907 | A1 | 6/2020 | Kim et al. | |
| 2020/0322712 | A1 | 10/2020 | Williams et al. | |
| 2024/0031727 | A1 * | 1/2024 | Park | H04R 1/1075 |

* cited by examiner

ACOUSTIC INSERT FOR EARPIECE

CROSS REFERENCE TO RELATED APPLICATIONS

This application is a national stage filing under 35 U.S.C. 371 of PCT/US2022/031407, filed May 27, 2022, which claims the benefit of U.S. Provisional Application No. 63/194,652, filed May 28, 2021, and U.S. Provisional Application No. 63/227,681, filed Jul. 30, 2021, the disclosure of which is incorporated by reference in their entirety herein.

FIELD

The present disclosure relates to earpieces and to acoustic inserts for the same. The present disclosure further relates to methods of using earpieces including the acoustic insert.

SUMMARY

An earpiece includes a shell forming a cavity and a sound channel having a first end connected to and in communication with the cavity, and a second end opposite to the first end, the sound channel forming a single pass-through cavity extending from the first end to the second end; an insert disposed within the cavity; a speaker; a circuit board assembly mounted onto the insert, the circuit board assembly comprising a printed circuit board defining a first side and a second side, and a first microphone disposed on the first side; an acoustic chamber formed between the insert and the circuit board assembly, the first microphone being disposed within the acoustic chamber; and an acoustic channel extending from the acoustic chamber, the acoustic channel being in communication with the sound channel. The insert may acoustically isolate the speaker from the first microphone. The acoustic channel may reduce sounds above a cut-off frequency from the speaker to the first microphone by 12 dB or more per octave. The cut-off frequency may be in a range from 20 Hz to 20000 Hz or from 500 Hz to 2000 Hz. The insert may be formed of a single integral mass of elastomeric material.

An earpiece includes a shell forming a cavity and a sound channel having a first end connected to and in communication with the cavity, and a second end opposite to the first end, the sound channel forming a single pass-through cavity extending from the first end to the second end; a speaker arranged to emit sound toward the sound channel; an acoustic chamber formed within the cavity, the acoustic chamber being acoustically isolated from the speaker; a microphone disposed within the acoustic chamber; and an acoustic channel extending from the acoustic chamber to the sound channel, the acoustic channel being configured to reduce sounds above a cut-off frequency from the speaker to the microphone by 12 dB or more per octave.

A method of assembling an earpiece includes placing an insert into a first portion of a shell, thereby forming an acoustic channel between the insert and the first portion of the shell; inserting a speaker into an opening in the insert; mounting a circuit board assembly onto the first portion of the shell, thereby forming an acoustic chamber between the insert and the circuit board assembly, the acoustic chamber being in fluid communication with the acoustic channel, the circuit board assembly comprising a circuit board and a first microphone disposed on a first major side of the circuit board; and attaching a second portion of the shell to the first portion of the shell, thereby encapsulating the insert, the speaker, and the circuit board assembly inside the shell. The method may further include soldering the speaker directly to the circuit board.

An earpiece includes a shell forming a cavity and a sound channel having a first end connected to and in communication with the cavity, and a second end opposite to the first end, the sound channel forming a single pass-through cavity extending from the first end to the second end; an insert disposed within the cavity; a speaker; a circuit board assembly mounted onto the insert, the circuit board assembly comprising a printed circuit board defining a first side and a second side, and a first microphone disposed on the first side; an acoustic chamber formed between the insert and the circuit board assembly, the first microphone being disposed within the acoustic chamber; and an acoustic channel extending from the acoustic chamber, the acoustic channel being in communication with the sound channel; and wherein the circuit board assembly further comprises a controller comprising one or more processors and configured to receive audio signals from the first microphone when the speaker generates sound.

An earpiece includes a shell forming a cavity and a sound channel having a first end connected to and in communication with the cavity, and a second end opposite to the first end, the sound channel forming a single pass-through cavity extending from the first end to the second end; a speaker arranged to emit sound toward the sound channel; an acoustic chamber formed within the cavity; an acoustic barrier arranged between the sound channel and the acoustic chamber; a microphone disposed within the acoustic chamber; and an acoustic channel extending from the acoustic chamber to the sound channel to provide an acoustic path for sound around or through the acoustic barrier, the acoustic channel being configured to reduce sounds above a cut-off frequency from the speaker to the microphone by 12 dB or more per octave; and a circuit board assembly comprising a controller comprising one or more processors and configured to receive audio signals from the first microphone when the speaker generates sound.

A method for preventing microphone saturation or reducing acoustic coupling between a speaker and a microphone of an earpiece, the method includes emitting sound into a sound channel of the earpiece using the speaker, the sound channel forming a single pass-through cavity extending from a first end to a second end; attenuating sounds above a cut-off frequency using an acoustic channel and an acoustic chamber of the earpiece, wherein the acoustic channel extends from the sound channel to the acoustic chamber and the acoustic channel provides an acoustic path for sound around or through an acoustic barrier between the sound channel and the acoustic chamber; receiving sound in the acoustic chamber and generating an acoustic signal based on the received sound using the microphone, wherein the microphone is located in the acoustic chamber, and wherein the received sound includes sound emitted into the sound channel using the speaker.

DEFINITIONS

Figure 1A:
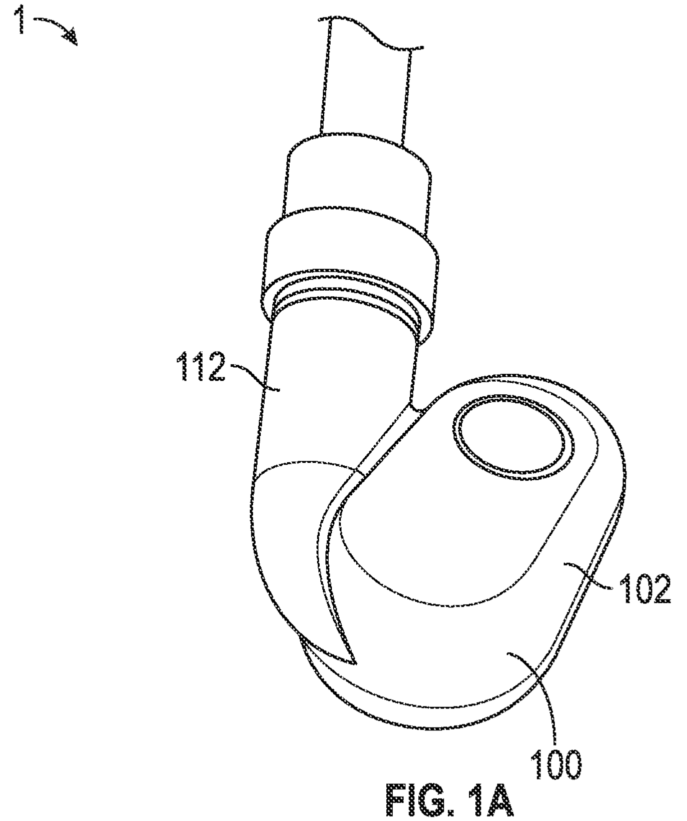
FIG. 1A is a top perspective view of an earpiece and wire according to an embodiment.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "elastomer" is used here to refer to a polymer with viscoelasticity (both viscosity and elasticity). Elastomers typically exhibit weak intermolecular forces, low Young's modulus, and high failure strain.

The term "acoustically isolate" is used herein to refer to dampening or reducing sound transmission between objects, structures, or regions. The sound may be dampened or reduced over all or a portion of the frequency range of the sound.

The term "transverse cross section" is used here to refer to a cross section that is orthogonal to a length (e.g., longitudinal axis) of the item.

The term "octave" is used here to refer to an interval between two frequencies where the higher frequency is two times the lower frequency.

The term "substantially" as used here has the same meaning as "significantly," and can be understood to modify the term that follows by at least about 90%, at least about 95%, or at least about 98%.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as +5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to earpieces and to acoustic inserts for the same.

Earpieces, such as those intended for use with various communications devices (e.g., phones, two-way radios, and the like), may include various acoustic components. For example, an earpiece may include a speaker and one or more microphones. Such components may be acoustically sealed to reduce interference between the components (e.g., between a speaker and a microphone). But acoustically sealing multiple components inside an acoustical earpiece can be difficult to achieve.

Communication earpieces often feature a narrow sound channel to acoustically couple a communication earpiece to a user's ear canal. This sound channel adds its length to the sound channel of the earpiece itself. This long and narrow sound channel leading to a sealed volume that is the ear canal can create a detrimental acoustical network in front of the speaker of the earpiece. When an in-ear microphone is present and shares the same sound channel, the acoustical network can cause sound to be amplified by 40 dB or even more at certain frequencies as it travels from the loudspeaker output to the microphone input. This can drive the microphone into acoustical overload when content is being played through the loudspeaker, even at moderate listening levels. Acoustical overload may cause the microphone's signal to be clipped and introduces nonlinear distortions, creating detrimental audible artifacts. This can prevent the microphone's signal from being used successfully in algorithms such as echo cancellation or for monitoring algorithms such as in-ear dosimetry. It may also detrimentally impact quality in-ear speech pickup while ambient listening is active.

Existing devices often utilize two sound channels (two smaller tubes) to separate the speaker and microphone signals to reduce the detrimental acoustical effect. But designing the earpiece for two channels can reach the upper limit of manufacturability due to the small size requirement for fitting in the ear canal. The two sound channel design is also unpractical to realize on communication earpieces.

It is desirable to reduce manufacturing complexity in the making of earpieces. It is desirable to provide an earpiece with a single sound channel.

According to an embodiment, the earpiece includes an acoustic chamber and an acoustic channel that cooperate to dampen sounds from the speaker above a cut-off frequency. The term "cut-off frequency" is understood to mean the point where the magnitude of the transfer function characterizing the second order low pass filter reaches −6 dB when the filter has a quality factor Q of 0.7071.

The acoustic chamber and acoustic channel may act as a Helmholtz resonator. An in-ear microphone may be disposed within the acoustic chamber. The in-ear microphone placed in the acoustic chamber may act like a second order low-pass filter. The acoustic channel may connect the acoustic chamber to the sound channel, which is in communication with the speaker. The acoustic chamber and acoustic channel may enable the earpiece to have a single sound channel while alleviating the overloading of the microphone.

The acoustic chamber and acoustic channel may be achieved by any suitable construction. In some embodiments, the acoustic chamber and acoustic channel are constructed using one or more inserts placed within the shell of the earpiece. For example, an insert can be used to form the acoustic chamber, and another insert can be used to form the acoustic channel connected to the acoustic chamber. In one embodiment, the acoustic chamber and acoustic channel are formed by a single insert. The acoustic chamber and acoustic channel may be formed by cooperation of one or more inserts and the shell of the earpiece. In some embodiments, the acoustic chamber and acoustic channel are constructed using an adhesive, optionally together with one or more inserts.

According to an embodiment, the earpiece includes an acoustic insert made from an elastomeric material. The acoustic insert may be used to conveniently form the acoustic chamber and acoustic channel and thus enable the earpiece to have a single sound channel. The acoustic insert may also acoustically seal multiple components inside the earpiece. The acoustic insert may enable the sealing of the multiple components without the use of an adhesive. The acoustic insert may generate an acoustic network that dampens sounds at certain frequencies from the speaker to the microphone.

Generally, the insert described in the present disclosure may be used with any type of in-ear earpiece. The earpiece may be wired or wireless.

Figure 1B:
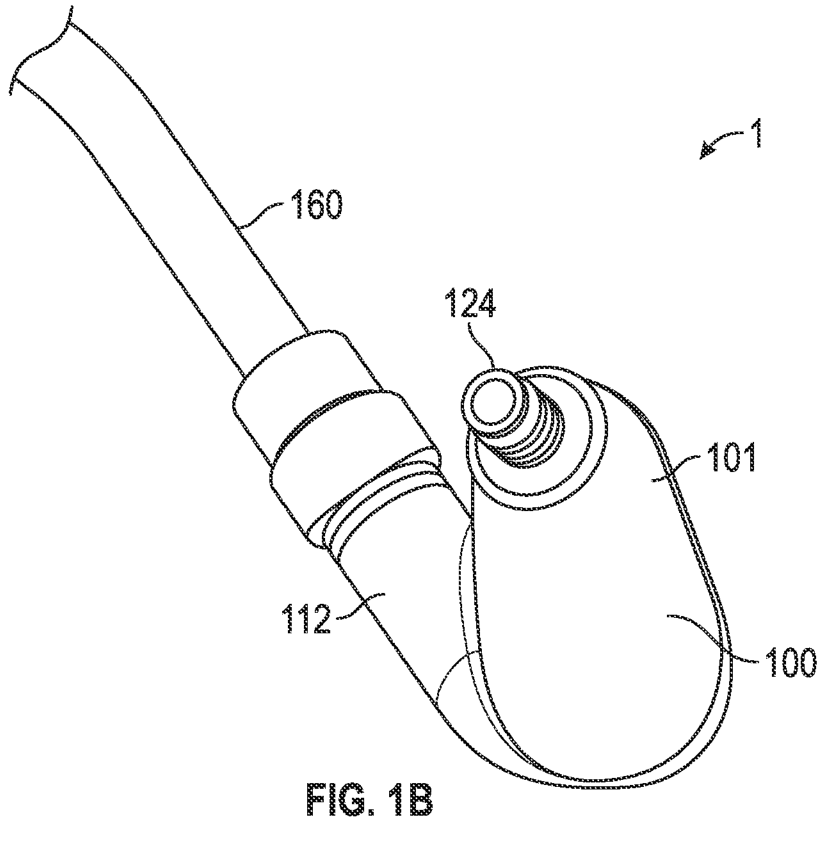
FIG. 1B is a bottom view of the earpiece of FIG. 1A.

An exemplary wired earpiece 1 is shown in FIGS. 1A and 1B. The earpiece 1 includes an outer shell 100 that houses the interior components of the earpiece 1. The key difference between wired and wireless earpieces is that the electrical components of a wired earpieces are connected to a wire or cable that may connect the earpiece components to a device, such as a communications or audio device, whereas a wireless earpiece connects wirelessly to the device and may include a rechargeable battery. The exemplary wired earpiece 1 includes a cable extension 112 protruding from the shell 100. The wire 160 may extend through the cable extension 112. The wire 160 may contain a cable 162 and an electrical wire 161 (shown in FIG. 4), connected at one end to one or more of the inner components of the earpiece 1. The wire 160 may form an earhook. The earpiece 1 is shown without the wire 160 in FIG. 2.

Figure 2:
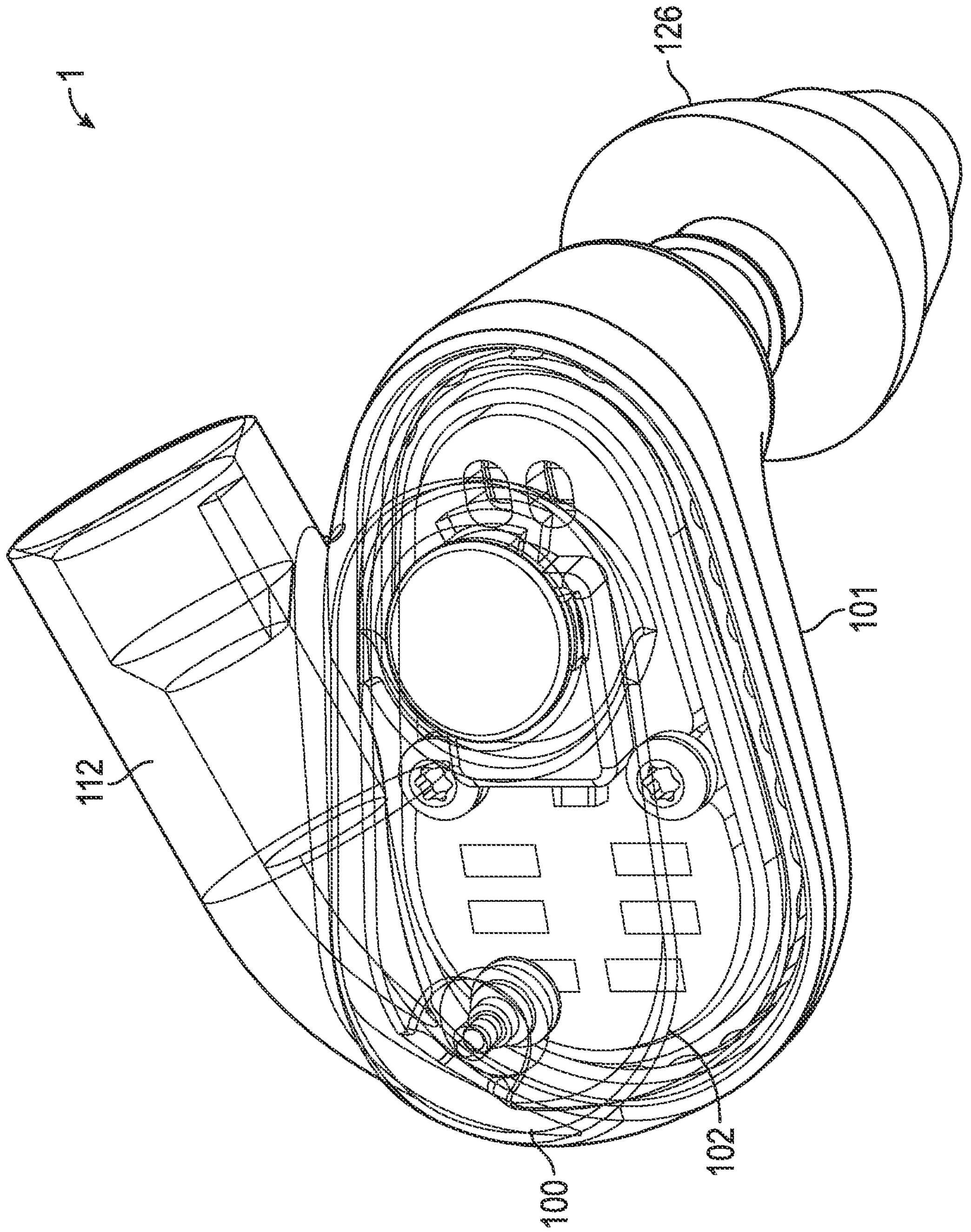
FIG. 2 is a top perspective view of an earpiece with an eartip according to an embodiment.

The earpiece 1 includes a speaker port 124, shown in FIG. 1B. The speaker port 124 is connectable with an eartip 126 as shown in FIG. 2. The eartip 126 may be inserted into the ear of a user. The eartip 126 may be made from an elastomeric material that allows for the formation of an acoustic seal between the earpiece 1 and the ear canal. The eartip 126 may be removable and replaceable.

Figure 3A:
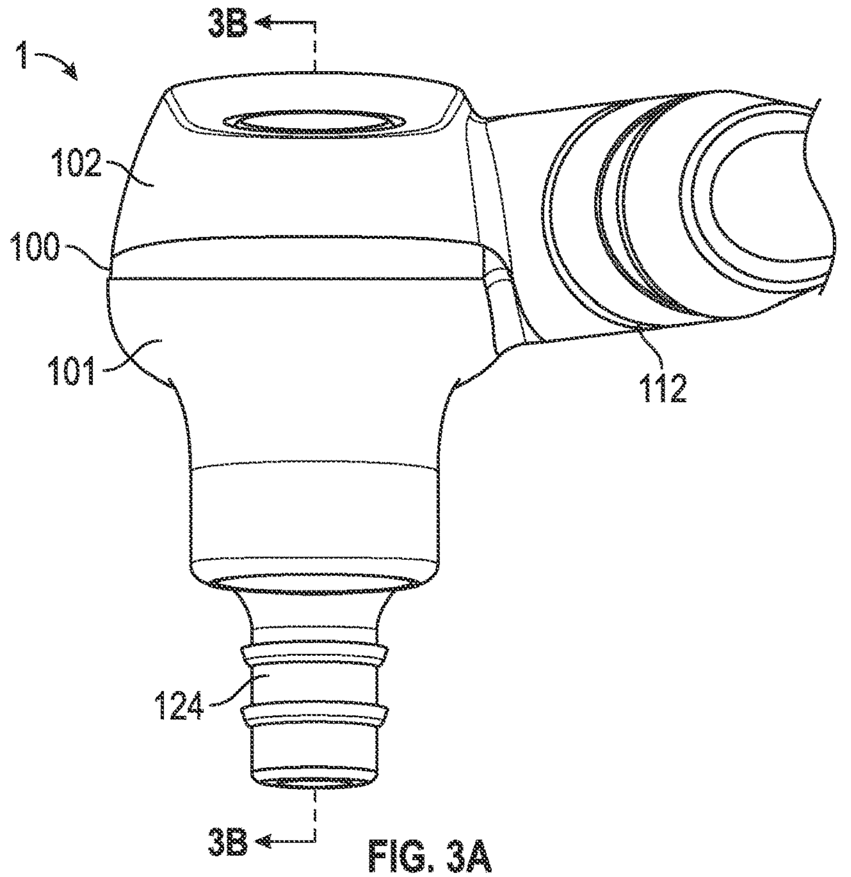
FIG. 3A is a side view of the earpiece of FIG. 2 according to an embodiment.
Figure 3B:
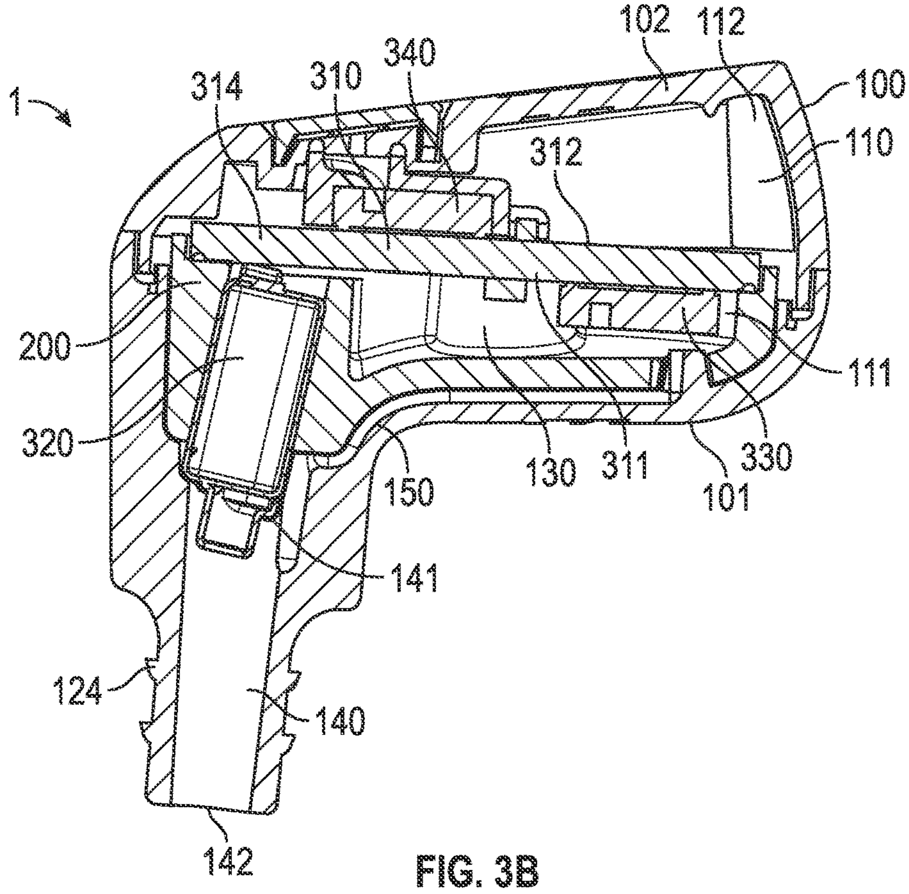
FIG. 3B is a cross-sectional view of the earpiece of FIG. 2 without an eartip according to an embodiment.
Figure 4:
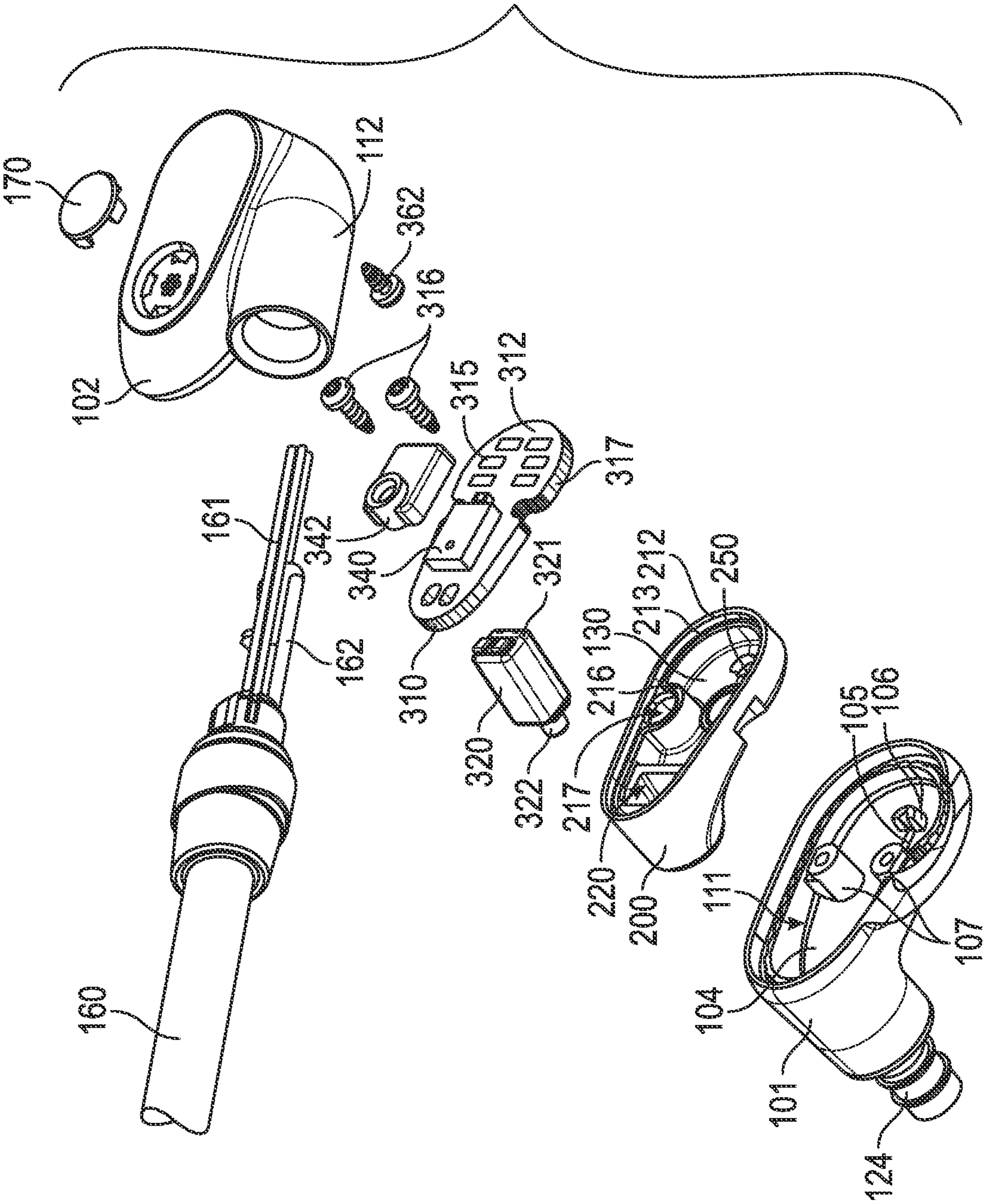
FIG. 4 is an exploded view of the earpiece and cable of FIG. 1A according to an embodiment.

As shown in FIGS. 3A and 3B and the exploded view in FIG. 4, the shell 100 of the earpiece 1 may include two parts: a first (or lower) part 101 and a second (or upper) part 102. The first and second parts 101, 102 may be coupled together, forming the shell 100 and defining an interior 110. The interior 110 may house the various internal components of the earpiece 1. The first part 101 may further include the speaker port 124. The first part 101 and the speaker port 124 define a sound channel 140 extending through the speaker port.

The interior 110 may be divided into a first cavity 111 and a second cavity 112. The first cavity 111 may be mainly or completely housed in the first part 101. The second cavity 112 may be mainly or completely housed in the second part 102. The interior 110 may be divided into the two cavities by a circuit board, such as a printed circuit board 314, housed in the interior 110.

Referring now to FIGS. 3B, 4, and FIGS. 5A and 5B (showing the earpiece 1 with the upper part 102 removed), the shell 100 (e.g., the first part 101) forms a cavity 111 (e.g., the first cavity 111) and a sound channel 140. The sound channel 140 extends from the cavity 111 from a first end 141 of the sound channel 140 to an opposing second end 142. The second end 142 is an open end. According to an embodiment, the sound channel 140 forms a single pass-through cavity extending from the first end 141 to the second end 142. That is, the sound channel 140 is undivided and is not divided into co-extending channels by a wall or other structure.

An insert 200 is disposed within the cavity 111. The insert 200 may be a molded element. In some embodiments, the insert 200 may define a single integral mass of elastomeric material. According to an embodiment, the insert 200 is a single integral molded element. For example, the insert 200 may be injection molded as a single integral piece. Alternatively, the insert 200 may be formed from two or more molded pieces.

The insert 200 may be injection molded from elastomeric material as a single integral piece. The insert 200 may be injection molded from elastomeric material as two or more pieces. In some embodiments, the insert 200 consists of elastomeric material. For example, the insert 200 may be free of adhesives.

In come embodiments the insert 200 is made from another (non-elastomeric) material. For example, the insert 200 may be injection molded from a polymeric material. The insert 200 may be injection molded from polymeric material as a single integral piece or as two or more pieces.

Figure 5A:
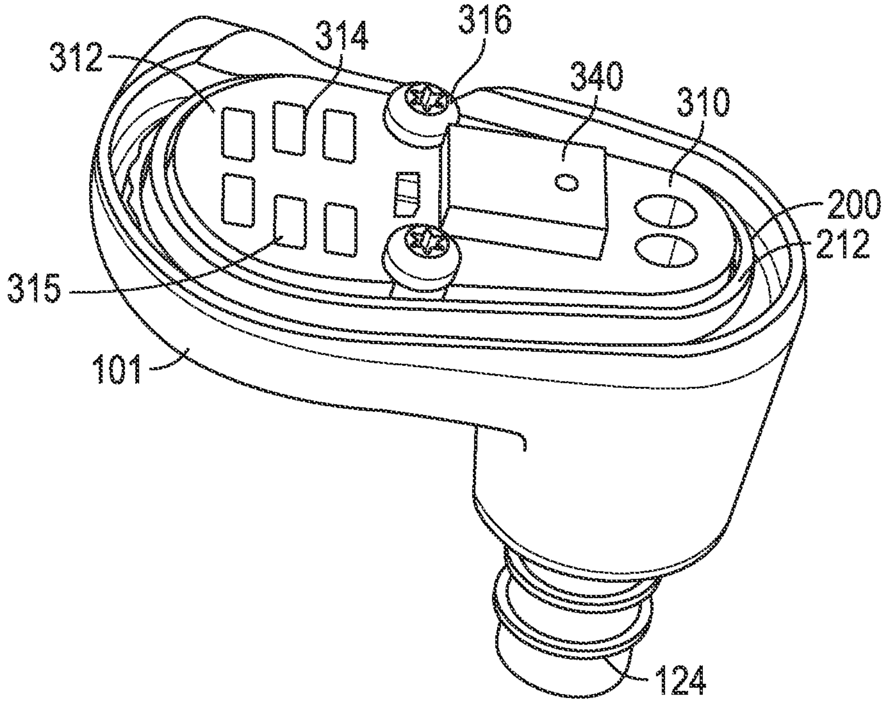
FIG. 5A is a perspective view of a lower part of the earpiece shell and internal components of the earpiece of FIG. 2 according to an embodiment.
Figure 5B:
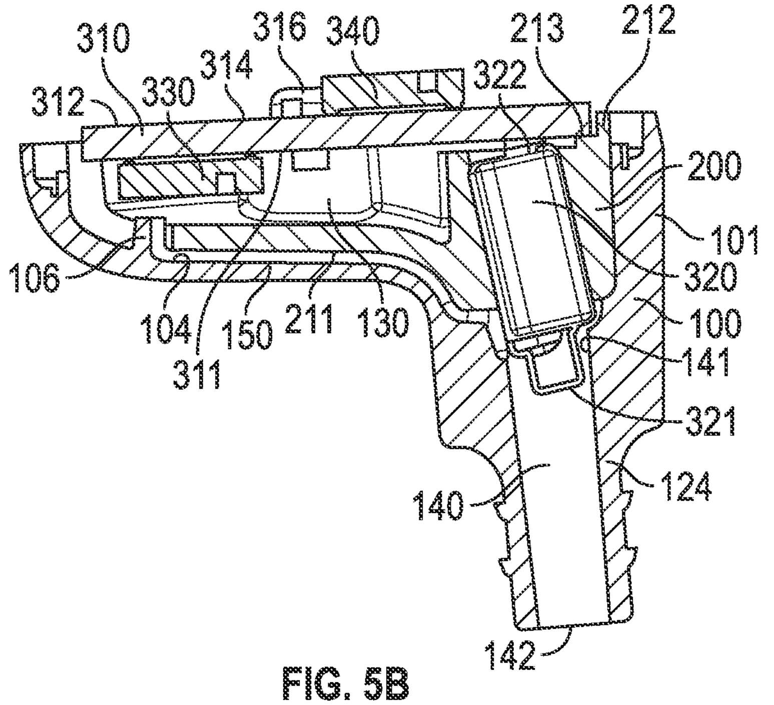
FIG. 5B is a cross-sectional view of the lower part of FIG. 5A according to an embodiment.
Figure 6:
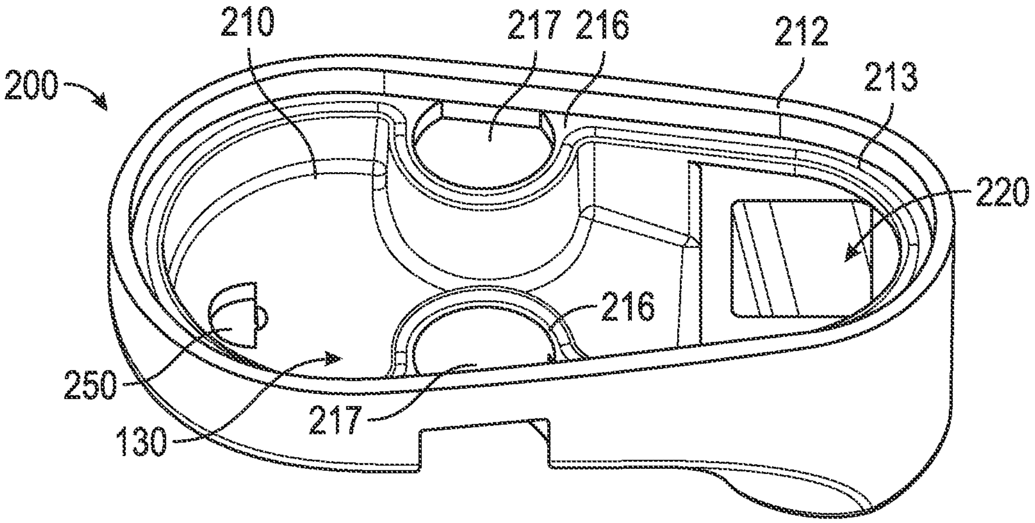
FIG. 6 is a perspective view of an insert of the earpiece of FIG. 2 according to an embodiment.

The earpiece 1 further includes a speaker 320. In some embodiments, the speaker 320 is partially embedded in the insert 200, as shown in FIGS. 3B and 5B. In some alternative embodiments, the speaker 320 is not embedded in the insert 200. For example, the speaker 320 may be disposed on the outside of the insert 200. The speaker 320 may be attached to the insert 200, for example, by a glue. The speaker 320 is constructed to project sound through the sound channel 140 and eartip 126 and into the user's ear canal. The speaker 320 may be positioned such that the sound-projecting end (e.g., first end 321) is oriented toward the sound channel 140. The first end 321 may extend into the sound channel 140.

A circuit board assembly 310 is mounted onto the insert 200. The circuit board assembly 310 may be seated on and seal against a rim 213 or ledge formed by the wall 212 of the insert 200. The circuit board assembly 310 includes a printed circuit board 314. The printed circuit board 314 defines a first major side 311 and a second major side 312 opposite of the first major side 311. The first major side 311 faces the first cavity 111 and the first part 101 of the shell 100. The second major side 312 faces the second cavity 312 and the second part 102 of the shell 100. A first microphone 330 is disposed on the first major side 311 of the printed circuit board 314. The first microphone 330 may be an in-ear microphone. An in-ear microphone may be used to read a sound pressure level in the ear canal of a user (e.g., at the junction of the earpiece and the ear canal). A second microphone 340 may be disposed on the second major side 312 of the printed circuit board 314. The first and second microphones 330, 340 may be independently selected from any suitable microphones, such as MEMS (Micro-Electro-Mechanical System) microphones.

The circuit board assembly 310 may also include a controller 315. The controller 315 may include one or more processors such as, e.g., one or more microprocessors, digital signal processors (DSPs), application-specific integrated circuit (ASICs), field programmable gate arrays (FPGAs), complex programmable logic device (CPLDs), microcontrollers, digital-to-analog converters (DACs), analog-to-digital converters (ADCs), or any other equivalent integrated or discrete logic circuitry. The controller 315 may be operatively coupled to transducers of the earpiece 1 such as, for example, the speaker 320, the first microphone 330, and the second microphone 340. The controller 315 may be operatively coupled to such transducers via a wired or wireless connection that allows the controller 315 to receive audio signals from the microphones 330, 340, or transmit audio signals to the speaker 320. Audio signals received from the microphones 330, 340 may converted to digital signals for digital signal processing. Audio signals transmitted to the speaker 320 may be digital or analog depending on the type of speaker 320. The audio signals transmitted to the speaker 320 may include components of the audio signals received from one or both of the microphones 330, 340.

An acoustic chamber 130 is formed between the insert 200 and the circuit board assembly 310. The first microphone 330 is disposed within the acoustic chamber 130. An acoustic channel 150 extends from the acoustic chamber 130 to the sound channel 140. The acoustic channel 150 may extend from the acoustic chamber to the first end 141 of the sound channel 140.

Referring now to FIGS. 5B, 6, and 7A-7H, the insert 200 has a bottom 210 surrounded by a wall 212. The outer surface 211 of the bottom 210 of the insert 200 may be disposed against the inner surface 104 of the shell 100. The acoustic channel 150 may be formed between the outer surface 211 of the bottom 210 and the inner surface 104 of the shell 100. One or both of the bottom 210 and the inner surface 104 may include an indentation or groove to facilitate formation of the acoustic channel 150. In the embodiment shown, the groove 105 is formed on the inner surface 104 of the shell 100. The acoustic channel 150 may be formed by the groove 105 and the bottom 210 of the insert 200. The groove 105, and thus the acoustic channel 150, may extend from a first end 151 below the first microphone 330 to a second end 152 at the sound channel 140 (see FIG. 8). The insert 200 has an aperture 250 that connects the acoustic chamber 130 to the acoustic channel 150. The shell 100 may include a protrusion 106 extending from the inner surface 104 at the first end 151 of the acoustic channel 150. The protrusion 106 may protrude through the aperture 250 in the insert 200. The protrusion 106 may form a first end of the groove 105.

The insert 200 is constructed to acoustically isolate the first microphone 330 from the speaker 320. The insert 200 may have a through opening 220 in which the speaker 320 is received. The insert 200 includes a partition wall 214. The partition wall 214 may form part of the wall surrounding the through opening 220. The partition wall 214 separates the through opening 220, in which the speaker 320 is disposed, from the acoustic chamber 130, in which the first microphone 330 is disposed. According to an embodiment, the first microphone 330 is in communication with the speaker 320 only via the acoustic channel 150 and the aperture 250.

Figure 8:
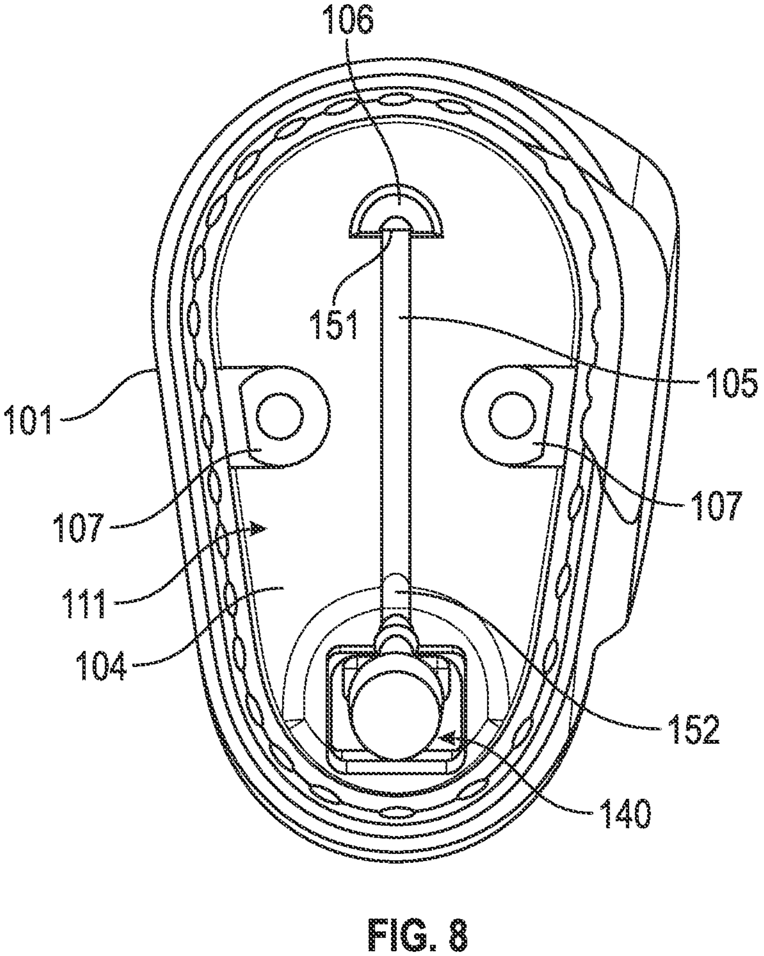
FIG. 8 is a top view of the lower part of the earpiece shell of the earpiece of FIG. 2 according to an embodiment.
Figure 10A:
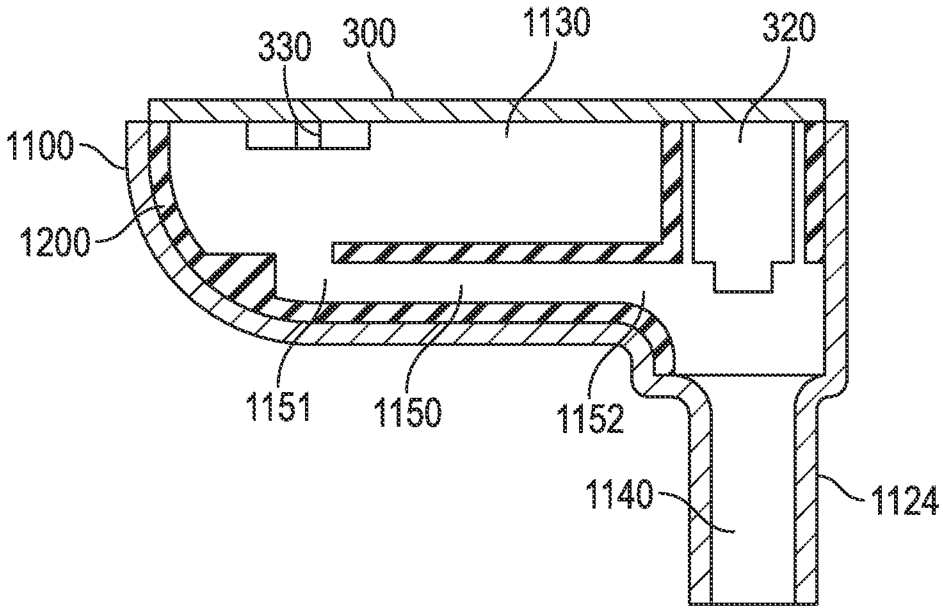
FIGS. 10A and 10B are schematic cross-sectional views of an earpiece showing an alternative acoustic channel according to an embodiment.
Figure 10B:
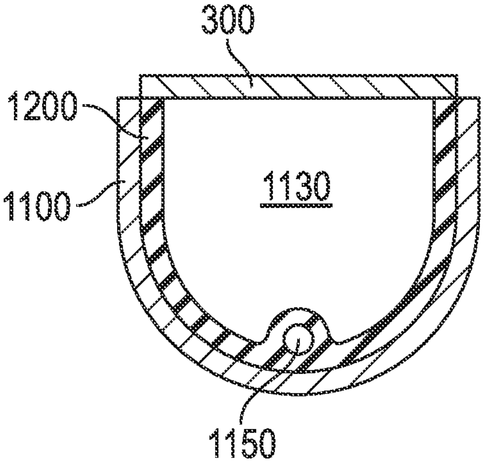
Figure 11A:
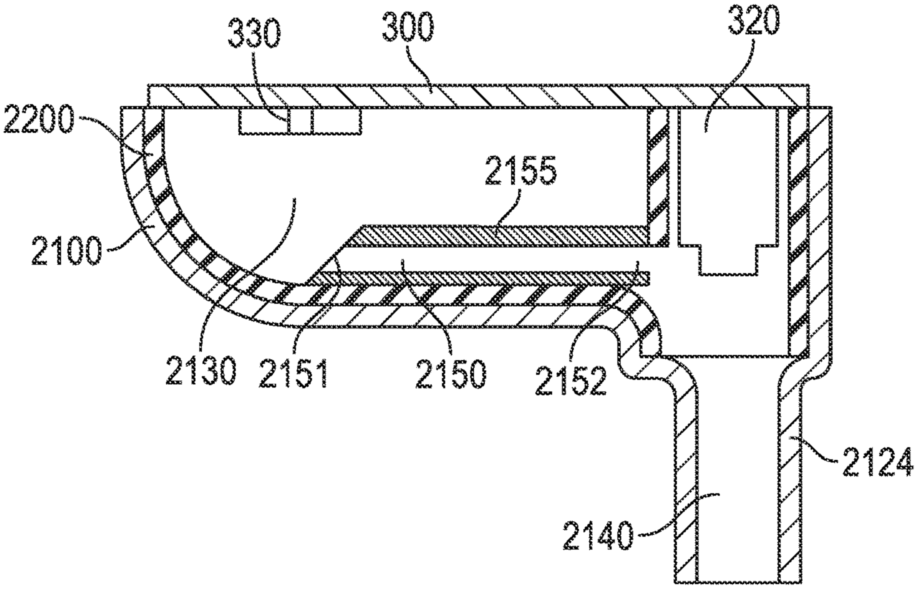
FIGS. 11A, 11B, and 12 are schematic cross-sectional views of an earpiece showing alternative acoustic channels according to an embodiment.
Figure 11B:
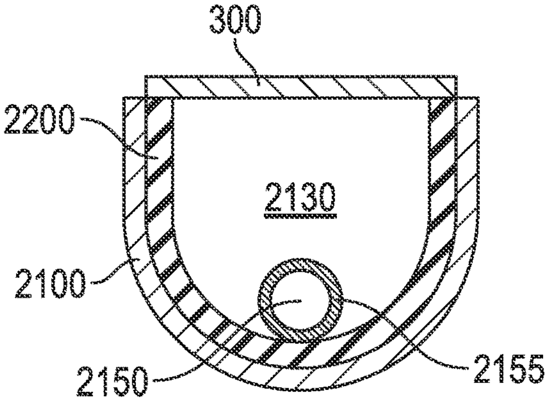
Figure 12:
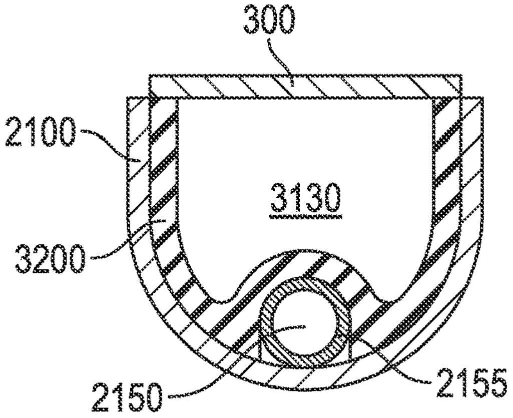

The acoustic channel 150 is configured and constructed to reduce or dampen sounds emanating from the speaker at certain frequencies. By adjusting the length and the transverse cross-sectional area of the channel, the dampened frequencies and the amount of dampening can be tailored to the specific needs of the earpiece. For example, the acoustic channel 150 can be designed as a "low pass" channel that cuts off high frequency sounds and lets low frequency sounds pass. The acoustic channel 150 may be formed as a groove 105 in the first part 101 of the shell 100, as shown in FIG. 8. Alternatively, the acoustic channel 1150 may be formed as a groove or channel in the insert 1200, as shown in FIGS. 10A-10B, or using a pre-formed tube 2150, as shown in FIGS. 11A-11C. For example, as schematically shown in FIGS. 10A-10B, the acoustic channel 1150 may be formed as a micro channel in the insert 1200. The acoustic channel 1150 (micro channel) may be molded into the insert 1200. The acoustic channel 1150 has a first end 1151 at the chamber 1130 and a second end 1152 near the sound channel 1140. The sound channel 1140 may be defined by the speaker port 1124. The speaker port 1124 may be included in a shell 1100. In another example, shown schematically in FIGS. 11A-11B, the acoustic channel 2150 is constructed by including a preformed tube 2155. The preformed tube 2155 may be disposed inside the insert 2200. The acoustic channel 2150 extends from a first end 2151 at the acoustic chamber 2130 to a second end 2152 near the sound channel 2140. The sound channel 2140 may be defined by the speaker port 2124. The speaker port 2124 may be included in a shell 2100. In another embodiment, the preformed tube 2155 is disposed on the outside of the insert 3200, extending from a first end 2151 at the acoustic chamber 3130 to a second end 2152 near the sound channel 2140. Alternatively, the acoustic channel 150 may be formed by corresponding grooves in both the shell 100 and the insert 200.

Reducing or dampening sounds emanating from the speaker 320 at certain frequencies using the acoustic channel 150 may allow the microphones 330, 340 to be utilized even when the speaker 320 is producing or generating sound. Accordingly, the controller 315 can receive audio signals from one or both of the microphones 330, 340 when the speaker 320 generates sound. In other words, the microphones 330, 340 may not be muted when the speaker 320 generates sound in earpieces that include one or more acoustic channels such as, for example, acoustic channel 150. The acoustic channel 150, in cooperation with the acoustic chamber 130, can prevent acoustical overload of the microphones that otherwise could cause clipping and distortion of the acoustic signals provided by the microphones. In contrast, earpieces that do not include means to dampen sounds emanating from a speaker at certain frequencies typically are configured to mute inner ear microphones to prevent such acoustical overload.

Figure 9A:
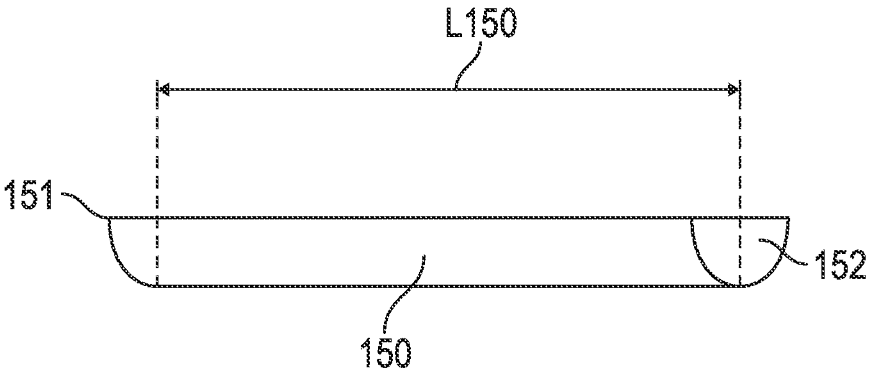
FIG. 9A is a schematic view of the groove in the earpiece shell of the earpiece of FIG. 2 according to an embodiment.
Figure 9B:
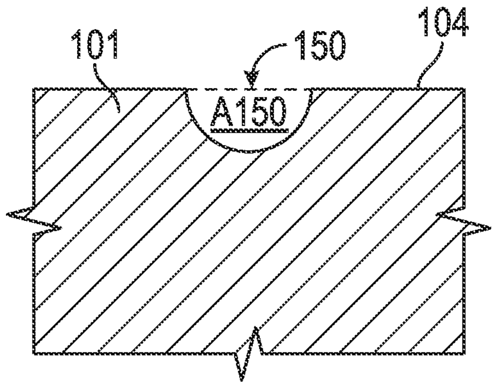
FIG. 9B is a schematic, partial cross-sectional view of the groove in the earpiece shell of the earpiece of FIG. 2 according to an embodiment.

According to an embodiment, the acoustic chamber 130 has a volume V130 and the acoustic channel 150 has a length L150 and a transverse cross-sectional area A150, as shown in FIGS. 9A and 9B. The volume V130, length L150, and cross-sectional area A150 may be adjusted such that the acoustic channel reduces sounds at a desired cut-off frequency. The cut-off frequency may be 20 Hz or greater, 50 Hz or greater, 100 Hz or greater, 200 Hz or greater, 400 Hz or greater, 500 Hz or greater, 600 Hz or greater, 800 Hz or greater, 1000 Hz or greater, 2000 Hz or greater, 5000 Hz or greater, 10000 Hz or greater, 15000 Hz or greater, or 20000 Hz or greater. The cut-off frequency may be 10000 Hz or lower, 5000 Hz or lower, 3000 Hz or lower, 2500 Hz or lower, 2000 Hz or lower, 1500 Hz or lower, or 1200 Hz or lower. The cut-off frequency may be chosen in a range of 20 Hz to 20000 Hz, 200 Hz to 10000 Hz, 500 Hz to 5000 Hz, or 800 Hz to 2000 Hz. Non-limiting examples of suitable cut-off frequencies are 800 Hz, 1000 Hz, 1200 Hz, and 1500 Hz. In some cases, it is desired to adjust the volume V130, length L150, and cross-sectional area A150 to achieve a cut-off frequency in a range of 500 Hz to 2000 Hz, 800 Hz to 1200 Hz, or about 1000 Hz. The length L150 and cross-sectional area A150 may be adjusted such that the acoustic channel reduces sounds at frequencies of 20 Hz or greater, 50 Hz or greater, 100 Hz or greater, 200 Hz or greater, 400 Hz or greater, 500 Hz or greater, 600 Hz or greater, 800 Hz or greater, 1000 Hz or greater, 2000 Hz or greater, 5000 Hz or greater, 10000 Hz or greater, 15000 Hz or greater, or 20000 Hz or greater. The length L150 and cross-sectional area A150 may be adjusted such that the acoustic channel reduces sounds at frequencies of 40000 Hz or below, 20000 Hz or below, or 10000 Hz or below. The length L150 and cross-sectional area A150 may be adjusted such that the acoustic channel reduces sounds at frequencies between 600 Hz and 10000 Hz, between 800 Hz and 10000 Hz, or between 1000 Hz and 10000 Hz. The volume V130, length L150, and cross-sectional area A150 may be adjusted such that the system (made up of the acoustic chamber 130 and acoustic channel 150) acts as a second order filter. That is, the system may reduce sounds above the cut-off frequency from the speaker to the first microphone by about 12 dB per octave.

By adding a second (or further) acoustic chamber and a second (or further) acoustic channel in series with the first acoustic chamber 130 and acoustic channel 150, the sound reduction may be increased by multiples of 12 dB per octave. In one embodiment, the earpiece includes a first acoustic chamber and a first acoustic channel, and a second acoustic chamber and a second acoustic channel, the first acoustic channel extending from the first acoustic chamber to the second acoustic chamber, and the second acoustic channel extending from the second acoustic chamber to the sound channel. The first microphone (the in-ear microphone) may be disposed within the first acoustic chamber. In this embodiment, the two sets of acoustic chambers and acoustic channels reduce the sound from the speaker to the microphone by 24 dB per octave.

When tuning the cut-off frequency of the acoustic channel 150, the length L150 and cross-sectional area A150 are considered in correlation with one another. The resonance frequency of the system made up of the acoustic chamber 130 and the acoustic channel 150 can be described by the following equation:

$$f_r = \frac{v}{2\pi} \cdot \sqrt{\frac{A}{Vl}},$$

where $f_r$ is the resonance frequency, v is the speed of sound, A is the cross-sectional area (A150) of the acoustic channel 150, V is the volume (V130) of the acoustic chamber 130, and 1 is the length (L150) of the acoustic channel 150.

For practical reasons, the minimum and maximum size of the acoustic chamber 130 and the acoustic channel 150 may be limited. For example, the acoustic chamber 130 may have a volume V130 of 1 $mm^3$ or greater, 5 $mm^3$ or greater, 10 $mm^3$ or greater, 20 $mm^3$ or greater, 30 $mm^3$ or greater, 40 $mm^3$ or greater, 50 $mm^3$ or greater, or 60 $mm^3$ or greater. The acoustic chamber 130 may have a volume V130 of 400 $mm^3$ or less, 300 $mm^3$ or less, 200 $mm^3$ or less, 150 $mm^3$ or less, 125 $mm^3$ or less, or 100 $mm^3$ or less. The acoustic chamber 130 may have a volume V130 ranging from 1 $mm^3$ to 400 $mm^3$, from 30 $mm^3$ to 150 $mm^3$, from 40 $mm^3$ to 125 $mm^3$, or from 70 $mm^3$ to 85 $mm^3$. The acoustic channel 150 may have a length L150 is 1 mm or greater, 3 mm or greater, 5 mm or greater, 6 mm or greater, 7 mm or greater, 8 mm or greater or 9 mm or greater. The length L150 may be 50 mm or less, 40 mm or less, 30 mm or less, 20 mm or less, 15 mm or less, 14 mm or less, 13 mm or less, or 12 mm or less. In some embodiments, the length L150 ranges from 1 mm to 50 mm, 2 mm to 25 mm, 5 mm to 15 mm, or from 9 mm to 12 mm. The cross-sectional area A150 may be 0.03 $mm^2$ or greater, 0.08 $mm^2$ or greater, 0.1 $mm^2$ or greater, 0.2 $mm^2$ or greater, 0.3 $mm^2$ or greater, 0.4 $mm^2$ or greater, or 0.5 $mm^2$ or greater. The cross-sectional area A150 may be 3.2 $mm^2$ or less, 3.0 $mm^2$ or less, 2.5 $mm^2$ or less, 2.0 $mm^2$ or less, 1.5 $mm^2$ or less, 1.2 $mm^2$ or less, 1.0 $mm^2$ or less, or 0.8 $mm^2$ or less. The cross-sectional area A150 may range from 0.03 $mm^2$ to 3.2 $mm^2$, 0.1 $mm^2$ to 2.0 $mm^2$, or 0.3 $mm^2$ to 1.0 $mm^2$. In one embodiment, the volume V130, length L150, and cross-sectional area A150 are adjusted such that above-discussed cut-off frequency is reached.

According to an embodiment, the insert provides several benefits for ease of manufacturing. For example, by using the insert 200, the internal components of the earpiece 1 can be mounted, secured in place, and sealed without the use of an adhesive. As discussed above, the insert 200 isolates the speaker 320 from the first microphone 330 and forms an acoustic network that includes an acoustic chamber 130 and an acoustic channel 150 that dampens certain sound frequencies from the speaker 320. The insert 200 also provides a supporting structure for the speaker 320, as well as a surface for mounting the circuit board assembly 310.

Figure 7A:
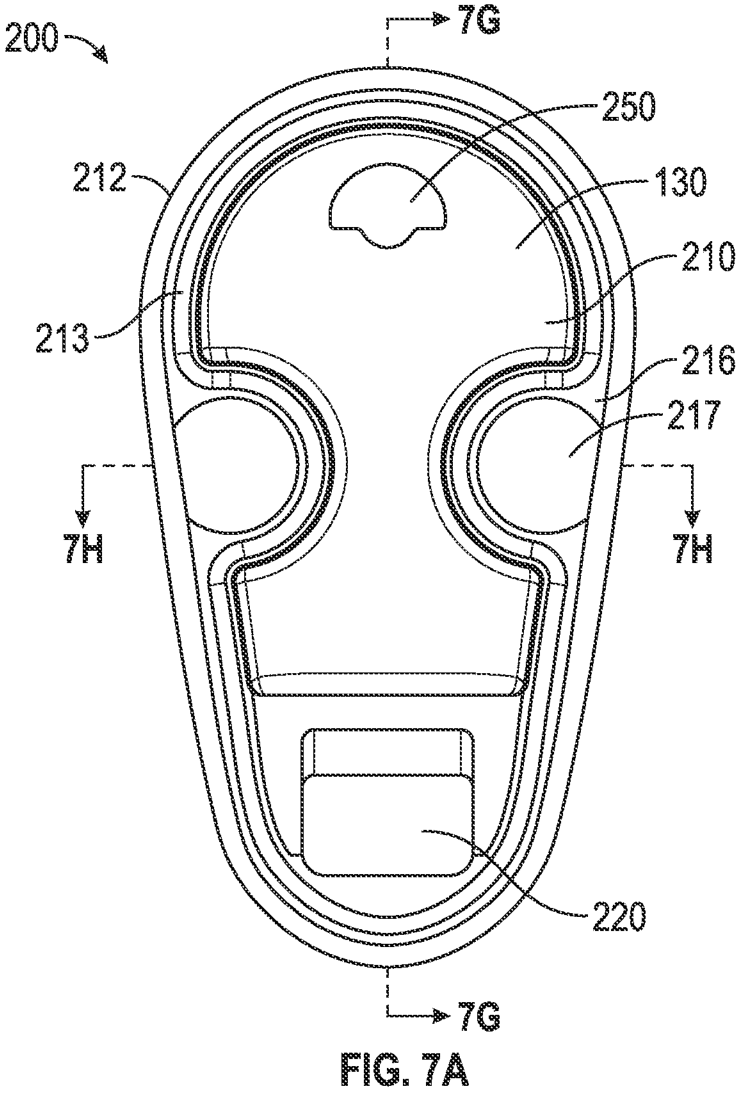
FIG. 7A is a top view of the insert of FIG. 6 according to an embodiment.
Figure 7C:
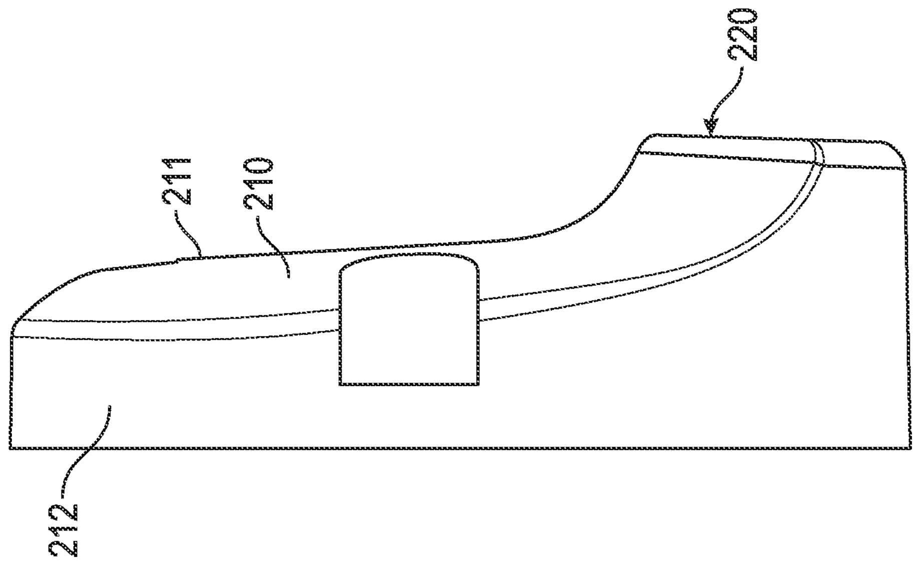
FIGS. 7C and 7D are side and front views, respectively, of the insert of FIG. 6 according to an embodiment.
Figure 7B:
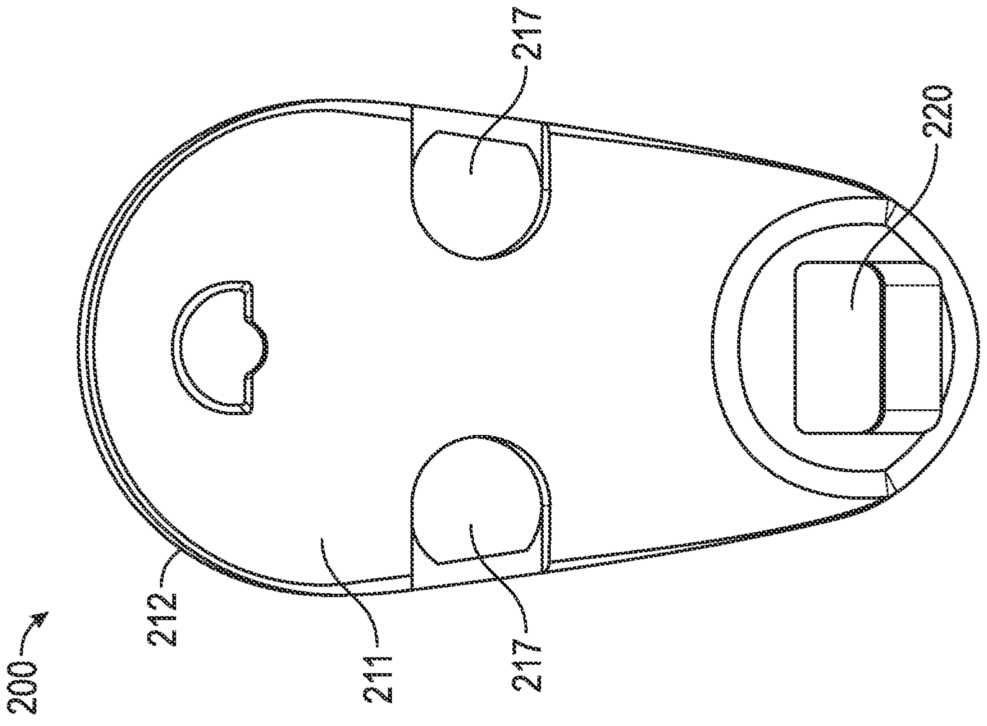
FIG. 7B is a bottom view of the insert of FIG. 6 according to an embodiment.
Figure 7D:
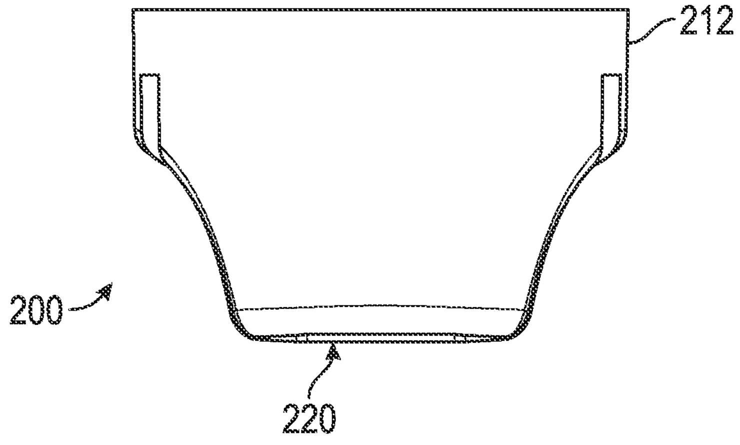
Figure 7E:
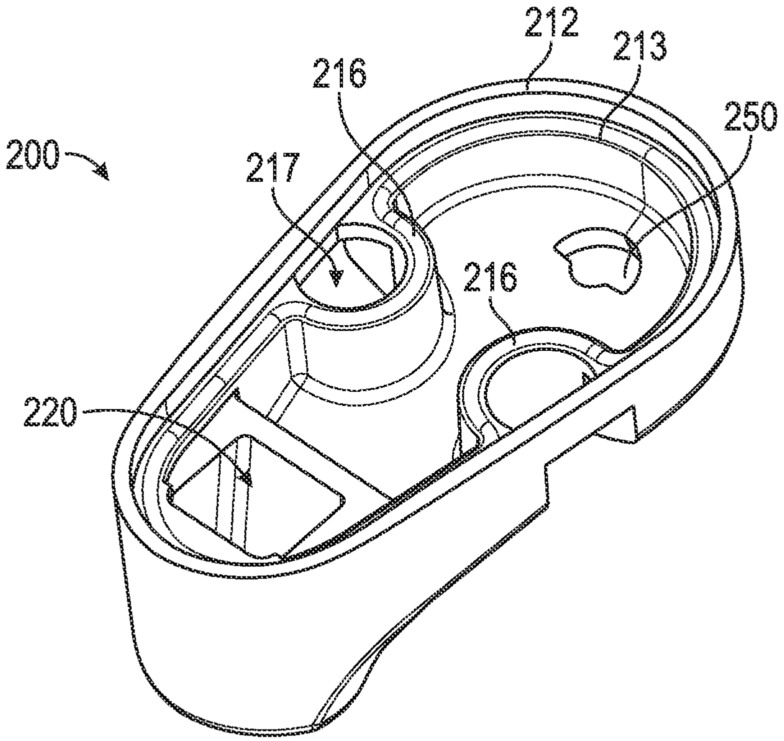
FIG. 7E is a top perspective view of the insert of FIG. 6 according to an embodiment.
Figure 7F:
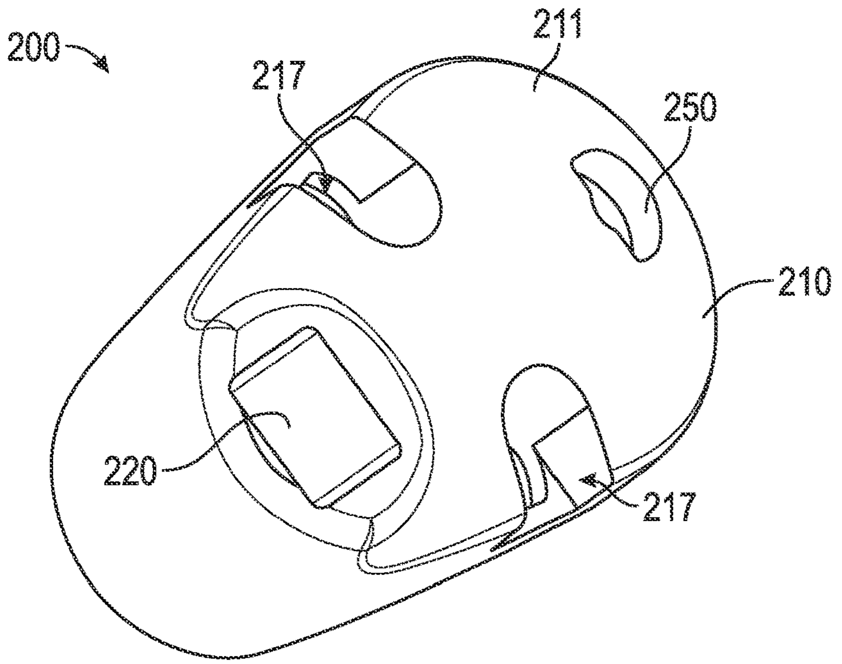
FIG. 7F is a bottom perspective view of the insert of FIG. 6 according to an embodiment.
Figure 7G:
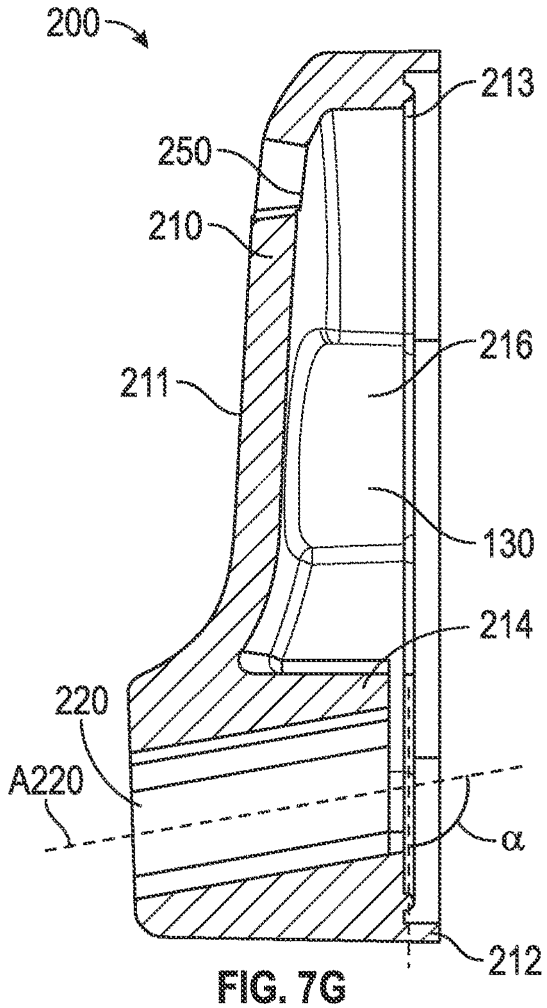
FIG. 7G is a cross-sectional view of the insert of FIG. 6 according to an embodiment.

According to an embodiment, the insert 200 has a through opening 220 for receiving the speaker 320. The through opening 220 has a longitudinal center axis A220. The longitudinal center axis A220 may be disposed at an angle within the insert 200. That is, the longitudinal center axis A220 may be non-orthogonal relative to a plane defined by an outer rim 213 or ledge formed by the wall 212 of the insert 200, as shown in FIG. 7G. The longitudinal center axis A220 may be disposed at an angle $\alpha$ relative to the plane of the outer rim 213. When the speaker 320 is received within the through opening 220, the speaker 320 is disposed at an angle relative to the printed circuit board 314, which is mounted on the rim 213. The speaker 320 has a first end 321 and an opposing second end 322, and a longitudinal axis A320 extending from the first end 321 to the second end 322. When the speaker 320 is received within the through opening 220, the longitudinal axis A320 of the speaker 320 aligns with the longitudinal center axis A220 of the through opening 220. The through opening 220 may be sized so that the speaker 320 fits snugly within the through opening 220 (that is, the speaker 320 is supported on all sides by the material of the insert 200). As the speaker 320 is supported by the insert 200, the speaker 320 may be directly coupled with the printed circuit board 314. For example, the second end 322 of the speaker 320 may be soldered directly onto the printed circuit board 314 without the use of wires. Alternatively, the speaker 320 may be connected electrically to the printed circuit board 314 by using a flex part or one or more wires. The first end 321 of the speaker 320 may extend into the sound channel 140.

As noted, the internal components of the earpiece 1 can be mounted, secured in place, and sealed without the use of an adhesive. The lack of adhesive eliminates manufacturing complexities and potential messes that may result from the use of adhesives. Further, the components may be dismantled, if necessary, for repairs or adjustments. According to an embodiment, the earpiece 1 is free of an adhesive between the shell 100 and the circuit board assembly 310. In particular, the earpiece may be free of an adhesive between the first part 101 of the shell 100 and the circuit board assembly 310. The two parts (first part 101 and second part 102) of the shell 100 may be adhered together by an adhesive, snap fit, friction fit, or a fastener (such as a screw, clip, or the like).

Figure 7H:
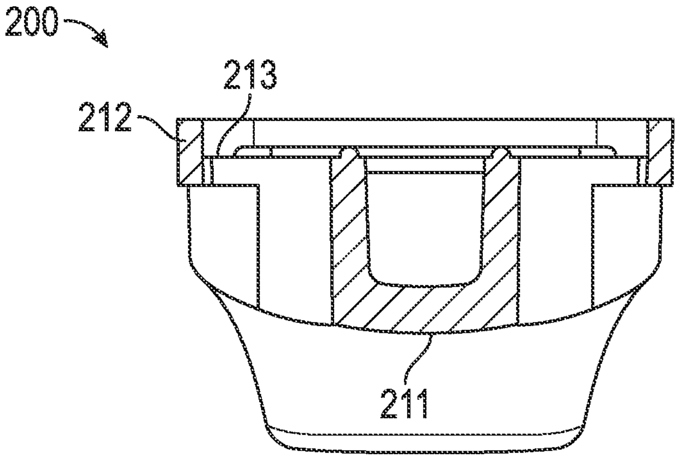
FIG. 7H is a cross-sectional view of the insert of FIG. 6 according to an embodiment.

The insert 200 has a bottom 210 outer surface 211 that is disposed against the inner surface 104 of the shell 100. The outer surface 211 may be shaped so that it is in contact with the inner surface 104 of the shell 100 along the entire bottom 210 with the exception of the groove 105. The outer surface 211 may have a continuously convex surface in a transverse cross section as shown in FIG. 7H.

The circuit board assembly 310 may be attached to the shell 100 via one or more fasteners 316 extending through the insert 200. Any suitable fastener may be used, such as a screw, clip, pin, bayonet-style fastener, or the like. In one embodiment, the fasteners are screws. In one embodiment, the circuit board assembly 310 is attached to the first part 101 of the shell 100 by two screws. The shell 100 may include one or more supports 107 constructed to receive one or more fasteners 316 (e.g., screws). The insert 200 may include a corresponding protrusion 216 extending inwardly (into the acoustic chamber 130) from the wall 212 that mates with and/or covers the support 107. The protrusion 216 may have a through hole 217 for the fastener 316 (e.g., screw) to extend through. The printed circuit board 314 fastened to the shell 100 via the fasteners 316 may apply a permanent compressive force on the insert 200. The compressive force may improve the acoustical sealing provided by the insert 200.

The insert 200 may be constructed from any suitable material, such as an elastomer. In some embodiments, the insert 200 is made of an elastomeric material having a Shore A hardness of 20 or greater, 30 or greater, 40 or greater, 50 or greater, 60 or greater, or 65 or greater. The insert 200 may be made of an elastomeric material having a Shore A hardness of 90 or less, 85 or less, 80 or less, or 75 or less. The insert 200 may be made of an elastomeric material having a Shore A hardness from 20 to 90, from 50 to 85, or from 65 to 75. In one embodiment, the insert 200 is made of an elastomeric material having a Shore A hardness of about 70. Examples of suitable elastomeric materials include, for example, silicones, thermoplastic elastomers, thermoplastic polyurethanes, and the like. Preferably the elastomeric material is selected to provide sufficient support for the circuit board assembly 310, be able withstand compression over time, and be sufficiently soft to seal against the circuit board assembly 310 and around the speaker 320. In one embodiment, the insert 200 is made of a silicone having a Shore A hardness from 65 to 75 or about 70. The insert 200 may be a single integral piece molded from the elastomeric material. For example, the insert 200 may be a single integral piece molded from silicone having a Shore A hardness from 65 to 75 or about 70.

The earpiece 1 may include additional parts as shown in FIG. 4, such as a microphone seal 342 constructed to seal around the second microphone 340, a wind screen 170 mounted on the outside of the second part 102 of the shell 100, and an anchoring screw 362 constructed to anchor the cable 162 to the earpiece 1.

Assembling an earpiece configured according to the present disclosure may include first inserting the insert into the shell 100 (e.g., the first part 101). The insert 200 may be placed into the shell 100 without the use of an adhesive. According to an embodiment, placing the insert 200 into the shell 100 forms the acoustic channel 150. The speaker 320 may then be placed into the opening 220. The circuit board assembly 310, which may include the first microphone 330 and the second microphone 340, may be placed onto the insert 200 and attached to the first part 101 of the shell 100 by one or more fasteners (e.g., screws). The speaker 320 may then be soldered to the printed circuit board 314. Preferably, the speaker 320 is soldered directly onto the printed circuit board 314 without intervening wires. The microphone seal 342 may be placed on the second microphone 340. The circuit board assembly 310 may then be soldered onto wires (in the case that the earpiece is a wired earpiece). The second part 102 of the shell 100 may then be placed onto the first part 101. The second part 102 maybe adhered to the first part 101 by an adhesive.

The techniques described in this disclosure, including those attributed to the systems, or various constituent components, may be implemented, at least in part, in hardware, software, firmware, or any combination thereof. For example, various aspects of the techniques may be implemented by the controller 315, which may use one or more processors such as, e.g., one or more microprocessors, DSPs, ASICs, FPGAs, CPLDs, microcontrollers, or any other equivalent integrated or discrete logic circuitry, as well as any combinations of such components, sound processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the controller 315 to support one or more aspects of the functionality described in this disclosure.

ILLUSTRATIVE EMBODIMENTS

According to a first embodiment, an earpiece comprises: a shell forming a cavity and a sound channel having a first end connected to and in communication with the cavity, and a second end opposite to the first end, the sound channel forming a single pass-through cavity extending from the first end to the second end; an insert disposed within the cavity; a speaker; a circuit board assembly mounted onto the insert, the circuit board assembly comprising a printed circuit board defining a first side and a second side, and a first microphone disposed on the first side; an acoustic chamber formed between the insert and the circuit board assembly, the first microphone being disposed within the acoustic chamber; and an acoustic channel extending from the acoustic chamber, the acoustic channel being in communication with the sound channel.

Embodiment 2 is the earpiece of embodiment 1, wherein the insert acoustically isolates the speaker from the first microphone.

Embodiment 3 is the earpiece of embodiment 1 or 2, wherein the acoustic channel reduces sounds above a cut-off frequency from the speaker to the first microphone by 12 dB per octave.

Embodiment 4 is the earpiece of embodiment 3, wherein the cut-off frequency is from 500 Hz to 2000 Hz, 800 Hz to 1200 Hz, or about 1000 Hz. The cut-off frequency may be 20 Hz or above, 50 Hz or above, 100 Hz or above, 200 Hz or above, 400 Hz or above, 500 Hz or above, 600 Hz or above, 800 Hz or above, or 1000 Hz above. The cut-off frequency may be 3000 Hz or lower, 2500 Hz or lower, 2000 Hz or lower, 1500 Hz or lower, or 1200 Hz or lower.

Embodiment 5 is the earpiece of any one of embodiments 1 to 4, wherein the acoustic channel is formed by a groove in the shell, and a bottom outer surface of the insert, or by a molded channel in the insert, or by a pre-formed tube disposed within the insert or between the insert and the shell.

Embodiment 6 is the earpiece of any one of embodiments 1 to 5, wherein the insert comprises a through hole, and wherein the speaker is received in the through hole.

Embodiment 7 is the earpiece of embodiment 6, wherein the through hole has a longitudinal center axis that is non-orthogonal relative to a plane defined by an outer rim formed by a wall of the insert.

Embodiment 8 is the earpiece of any one of embodiments 1 to 7, wherein the speaker comprises a first end operatively coupled with the printed circuit board and an opposing second end extending into the sound channel.

Embodiment 9 is the earpiece of any one of embodiments 1 to 8, wherein the speaker is partially embedded in the insert.

Embodiment 10 is the earpiece of any one of embodiments 1 to 9, the shell comprising a first portion and a second portion coupled with the first portion, the first portion comprising the sound channel and the second portion comprising cable extension constructed to accommodate a cable extending from the circuit board assembly.

Embodiment 11 is the earpiece of any one of embodiments 1 to 10, wherein the earpiece is free of an adhesive between the shell and the circuit board assembly.

Embodiment 12 is the earpiece of any one of embodiments 1 to 11, wherein the insert comprises a bottom outer surface having a continuously convex surface.

Embodiment 13 is the earpiece of any one of embodiments 1 to 12, further comprising a second microphone mounted onto the second side of the printed circuit board.

Embodiment 14 is the earpiece of any one of embodiments 1 to 13, wherein the speaker is directly soldered onto the printed circuit board.

Embodiment 15 is the earpiece of any one of embodiments 1 to 14, wherein the circuit board assembly is attached to the shell via a fastener extending through the insert.

Embodiment 16 is the earpiece of any one of embodiments 1 to 15, wherein the insert comprises a single integral mass of elastomeric material, or wherein the insert comprises two pieces of elastomeric material.

Embodiment 17 is the earpiece of embodiment 16, wherein the elastomeric material has a Shore A hardness of 20 or greater, 30 or greater, 40 or greater, 50 or greater, 60 or greater, or 65 or greater. The elastomeric material may have a Shore A hardness of 90 or less, 85 or less, 80 or less, or 75 or less. The elastomeric material may have a Shore A hardness from 20 to 90, from 50 to 85, or from 65 to 75.

Embodiment 18 is the earpiece of embodiment 16 or 17, wherein the elastomeric material comprises silicone.

Embodiment 19 is the earpiece of any one of embodiments 1 to 18, further comprising a second acoustic chamber and a second acoustic channel in series with the acoustic chamber and acoustic channel, wherein the first acoustic channel extends from the acoustic chamber to the second acoustic chamber, and the second acoustic channel extends from the second acoustic chamber to the sound channel.

Embodiment 20 is a method of assembling an earpiece, the method comprising: placing an insert into a first portion of a shell, thereby forming an acoustic channel between the insert and the first portion of the shell; inserting a speaker into an opening in the insert; mounting a circuit board assembly onto the first portion of the shell, thereby forming an acoustic chamber between the insert and the circuit board assembly, the acoustic chamber being in fluid communication with the acoustic channel, the circuit board assembly comprising a circuit board and a first microphone disposed on a first major side of the circuit board; and attaching a second portion of the shell to the first portion of the shell, thereby encapsulating the insert, the speaker, and the circuit board assembly inside the shell.

Embodiment 21 is the method of embodiment 20, wherein the insert comprises a single integral mass of elastomeric material, or wherein the insert comprises two pieces of elastomeric material.

Embodiment 22 is the method of embodiment 20 or 21, wherein the insert is disposed in the first portion of the shell without using an adhesive.

Embodiment 23 is the method of any one of embodiments 20 to 22, wherein the circuit board assembly further comprises a second microphone disposed on a second major side of the circuit board opposite to the first major side.

Embodiment 24 is the method of any one of embodiments 20 to 23 further comprising soldering the speaker directly to the circuit board.

Embodiment 25 is the method of any one of embodiments 20 to 24, wherein the insert acoustically isolates the speaker from the first microphone.

Embodiment 26 is the method of any one of embodiments 20 to 25, wherein the acoustic channel reduces sounds above a cut-off frequency from the speaker to the first microphone by 12 dB or more per octave.

Embodiment 27 is the method of any one of embodiments 20 to 26, wherein the acoustic channel reduces sounds above a cut-off frequency from the speaker to the first microphone by 24 dB or more per octave.

Embodiment 28 is the method of embodiment 26 or 27, wherein the cut-off frequency is from 500 Hz to 2000 Hz, 800 Hz to 1200 Hz, or about 1000 Hz. The cut-off frequency may be 20 Hz or above, 50 Hz or above, 100 Hz or above, 200 Hz or above, 400 Hz or above, 500 Hz or above, 600 Hz or above, 800 Hz or above, or 1000 Hz above. The cut-off frequency may be 3000 Hz or lower, 2500 Hz or lower, 2000 Hz or lower, 1500 Hz or lower, or 1200 Hz or lower.

Embodiment 29 is the method of any one of embodiments 20 to 28, wherein the acoustic channel is formed by a groove in the shell, and a bottom outer surface of the insert, or by a molded channel in the insert, or by a pre-formed tube disposed within the insert or between the insert and the shell.

Embodiment 30 is the method of any one of embodiments 20 to 29, wherein the insert comprises a through hole, and wherein the speaker is received in the through hole.

Embodiment 31 is any one of the preceding embodiments, wherein the acoustic chamber has a volume of 30 $mm^3$ or greater, 40 $mm^3$ or greater, 50 $mm^3$ or greater, or 60 $mm^3$ or greater. The acoustic chamber may have a volume of 150 $mm^3$ or less, 125 $mm^3$ or less, or 100 $mm^3$ or less. The acoustic chamber may have a volume ranging from 30 $mm^3$ to 150 $mm^3$ or from 40 $mm^3$ to 125 $mm^3$, or about 70 $mm^3$ to 85 $mm^3$.

Embodiment 32 is any one of the preceding embodiments, wherein the acoustic channel has a length is 5 mm or greater, 6 mm or greater, 7 mm or greater, 8 mm or greater or 9 mm or greater. The length may be 15 mm or less, 14 mm or less, 13 mm or less, or 12 mm or less. The length may range from 5 mm to 15 mm or from 9 mm to 12 mm.

Embodiment 33 is any one of the preceding embodiments, wherein the acoustic channel has a cross-sectional area may be 0.3 $mm^2$ or greater, 0.4 $mm^2$ or greater, or 0.5 $mm^2$ or greater. The cross-sectional area may be 1.0 $mm^2$ or less, or 0.8 $mm^2$ or less. The cross-sectional area may range from 0.3 $mm^2$ to 1.0 $mm^2$.

Embodiment 34 is an earpiece comprising: a shell forming a cavity and a sound channel having a first end connected to and in communication with the cavity, and a second end opposite to the first end, the sound channel forming a single pass-through cavity extending from the first end to the second end; a speaker arranged to emit sound toward the sound channel; an acoustic chamber formed within the cavity, the acoustic chamber being acoustically isolated from the speaker; a microphone disposed within the acoustic chamber; and an acoustic channel extending from the acoustic chamber to the sound channel, the acoustic channel being configured to reduce sounds above a cut-off frequency from the speaker to the microphone by 12 dB or more per octave.

Embodiment 35 is the earpiece of embodiment 34 further comprising an insert disposed within the shell and a circuit board assembly comprising a printed circuit board and mounted onto the insert, wherein the acoustic chamber is formed between the insert and the circuit board assembly, and wherein the microphone is disposed on a first side of the printed circuit board.

Embodiment 36 is the earpiece of embodiment 35, wherein the insert acoustically isolates the speaker from the first microphone.

Embodiment 37 is the earpiece of any one of embodiments 34-36, wherein the cut-off frequency is from 500 Hz to 2000 Hz, 800 Hz to 1200 Hz, or about 1000 Hz. the cut-off frequency may be 20 Hz or above, 50 Hz or above, 100 Hz or above, 200 Hz or above, 400 Hz or above, 500 Hz or above, 600 Hz or above, 800 Hz or above, or 1000 Hz above. the cut-off frequency may be 3000 Hz or lower, 2500 Hz or lower, 2000 Hz or lower, 1500 Hz or lower, or 1200 Hz or lower.

Embodiment 38 is the earpiece of any one of embodiments 34 to 37, wherein the acoustic channel is formed by a groove in the shell, and a bottom outer surface of the insert.

Embodiment 39 is the earpiece of any one of embodiments 35 to 38, wherein the insert comprises a through hole, and wherein the speaker is received in the through hole.

Embodiment 40 is the earpiece of embodiment 39, wherein the through hole has a longitudinal center axis that is non-orthogonal relative to a plane defined by an outer rim formed by a wall of the insert.

Embodiment 41 is the earpiece of any one of embodiments 35 to 40, wherein the speaker comprises a first end operatively coupled with the printed circuit board and an opposing second end extending into the sound channel.

Embodiment 42 is the earpiece of any one of embodiments 35 to 41, wherein the speaker is partially embedded in the insert.

Embodiment 43 is the earpiece of any one of embodiments 34 to 42, the shell comprising a first portion and a second portion coupled with the first portion, the first portion comprising the sound channel and the second portion comprising cable extension constructed to accommodate a cable extending from the circuit board assembly.

Embodiment 44 is the earpiece of any one of embodiments 35 to 43, wherein the earpiece is free of an adhesive between the shell and the circuit board assembly.

Embodiment 45 is the earpiece of any one of embodiments 35 to 44, wherein the insert comprises a bottom outer surface having a continuously convex surface.

Embodiment 46 is the earpiece of any one of embodiments 35 to 45, further comprising a second microphone mounted onto the second side of the printed circuit board.

Embodiment 47 is the earpiece of any one of embodiments 35 to 46, wherein the speaker is directly soldered onto the printed circuit board.

Embodiment 48 is the earpiece of any one of embodiments 35 to 47, wherein the circuit board assembly is attached to the shell via a fastener extending through the insert.

Embodiment 49 is the earpiece of any one of embodiments 35 to 48, wherein the insert comprises a single integral mass of elastomeric material.

Embodiment 50 is the earpiece of embodiment 49, wherein the elastomeric material has a Shore A hardness of 20 or greater, 30 or greater, 40 or greater, 50 or greater, 60 or greater, or 65 or greater. The elastomeric material may have a Shore A hardness of 90 or less, 85 or less, 80 or less, or 75 or less. the elastomeric material may have a Shore A hardness from 20 to 90, from 50 to 85, or from 65 to 75.

Embodiment 51 is the earpiece of embodiment 49 or 50, wherein the elastomeric material comprises silicone.

Embodiment 52 is an earpiece comprising: a shell forming a cavity and a sound channel having a first end connected to and in communication with the cavity, and a second end opposite to the first end, the sound channel forming a single pass-through cavity extending from the first end to the second end; an insert disposed within the cavity; a speaker; a circuit board assembly mounted onto the insert, the circuit board assembly comprising a printed circuit board defining a first side and a second side, and a first microphone disposed on the first side; an acoustic chamber formed between the insert and the circuit board assembly, the first microphone being disposed within the acoustic chamber; and an acoustic channel extending from the acoustic chamber, the acoustic channel being in communication with the sound channel; and wherein the circuit board assembly further comprises one or more processors configured to receive audio signals from the first microphone when the speaker generates sound.

Embodiment 53 is the earpiece of embodiment 52, wherein the acoustic channel and the acoustic chamber are configured to dampen sound provided by the speaker above a cut-off frequency.

Embodiment 54 is the earpiece of embodiment 52 or 53, wherein the acoustic channel reduces sounds above a cut-off frequency from the speaker to the first microphone by 12 dB per octave.

Embodiment 55 is the earpiece of embodiment 54, wherein the cut-off frequency is from 500 Hz to 2000 Hz.

Embodiment 56 is the earpiece of any one of embodiments 52 to 55, wherein the acoustic channel is formed by a groove in the shell, and a bottom outer surface of the insert.

Embodiment 57 is the earpiece of any one of embodiments 52 to 56, wherein the insert comprises a through hole, and wherein the speaker is received in the through hole.

Embodiment 58 is the earpiece of embodiment 57, wherein the through hole has a longitudinal center axis that is non-orthogonal relative to a plane defined by an outer rim formed by a wall of the insert.

Embodiment 59 is the earpiece of any one of embodiments 52 to 58, wherein the speaker comprises a first end operatively coupled with the printed circuit board and an opposing second end extending into the sound channel.

Embodiment 60 is the earpiece of any one of embodiments 52 to 59, wherein the speaker is partially embedded in the insert.

Embodiment 61 is the earpiece of any one of embodiments 52 to 60, the shell comprising a first portion and a second portion coupled with the first portion, the first portion comprising the sound channel and the second portion comprising cable extension constructed to accommodate a cable extending from the circuit board assembly.

Embodiment 62 is the earpiece of any one of embodiments 52 to 61, wherein the earpiece is free of an adhesive between the shell and the circuit board assembly.

Embodiment 63 is the earpiece of any one of embodiments 52 to 62, wherein the insert comprises a bottom outer surface having a continuously convex surface.

Embodiment 64 is the earpiece of any one of embodiments 52 to 63, further comprising a second microphone mounted onto the second side of the printed circuit board.

Embodiment 65 is the earpiece of any one of embodiments 52 to 64, wherein the speaker is directly soldered onto the printed circuit board.

Embodiment 66 is the earpiece of any one of embodiments 52 to 65, wherein the circuit board assembly is attached to the shell via a fastener extending through the insert.

Embodiment 67 is the earpiece of any one of embodiments 52 to 66, wherein the insert comprises a single integral mass of elastomeric material.

Embodiment 68 is the earpiece of embodiment 67, wherein the elastomeric material has a Shore A hardness of 68 or greater.

Embodiment 69 is the earpiece of embodiment 67 or 68, wherein the elastomeric material comprises silicone.

Embodiment 70 is the earpiece of any one of embodiments 52 to 69, further comprising a second acoustic chamber and a second acoustic channel in series with the acoustic chamber and acoustic channel, wherein the acoustic channel extends from the acoustic chamber to the second acoustic chamber, and the second acoustic channel extends from the second acoustic chamber to the sound channel.

Embodiment 71 is an earpiece comprising: a shell forming a cavity and a sound channel having a first end connected to and in communication with the cavity, and a second end opposite to the first end, the sound channel forming a single pass-through cavity extending from the first end to the second end; a speaker arranged to emit sound toward the sound channel; an acoustic chamber formed within the cavity; an acoustic barrier arranged between the sound channel and the acoustic chamber; a microphone disposed within the acoustic chamber; and an acoustic channel extending from the acoustic chamber to the sound channel to provide an acoustic path for sound around or through the acoustic barrier, the acoustic channel being configured to reduce sounds above a cut-off frequency from the speaker to the microphone by 12 dB or more per octave; and a circuit board assembly comprising one or more processors configured to receive audio signals from the first microphone when the speaker generates sound.

Embodiment 72 is the earpiece of embodiment 71 further comprising an insert disposed within the shell and a circuit board assembly comprising a printed circuit board and mounted onto the insert, wherein the acoustic chamber is formed between the insert and the circuit board assembly, and wherein the microphone is disposed on a first surface of the printed circuit board.

Embodiment 73 is the earpiece of embodiment 72, wherein the insert acoustically isolates the speaker from the first microphone.

Embodiment 74 is the earpiece of any one of embodiments 71 to 73, wherein the cut-off frequency is from 500 Hz to 2000 Hz.

Embodiment 75 is the earpiece of any one of embodiments 72 to 74, wherein the acoustic channel is formed by a groove in the shell, and a bottom outer surface of the insert.

Embodiment 76 is the earpiece of any one of embodiments 72 to 75, wherein the insert comprises a through hole, and wherein the speaker is received in the through hole.

Embodiment 77 is the earpiece of embodiment 76, wherein the through hole has a longitudinal center axis that is non-orthogonal relative to a plane defined by an outer rim formed by a wall of the insert.

Embodiment 78 is the earpiece of any one of embodiments 72 to 77, wherein the speaker comprises a first end operatively coupled with the printed circuit board and an opposing second end extending into the sound channel.

Embodiment 79 is the earpiece of any one of embodiments 72 to 78, wherein the speaker is partially embedded in the insert.

Embodiment 80 is the earpiece of any one of embodiments 71 to 79, the shell comprising a first portion and a second portion coupled with the first portion, the first portion comprising the sound channel and the second portion comprising cable extension constructed to accommodate a cable extending from the circuit board assembly.

Embodiment 81 is the earpiece of any one of embodiments 72 to 80, wherein the earpiece is free of an adhesive between the shell and the circuit board assembly.

Embodiment 82 is the earpiece of any one of embodiments 72 to 81, wherein the insert comprises a bottom outer surface having a continuously convex surface.

Embodiment 83 is the earpiece of any one of embodiments 72 to 82, further comprising a second microphone mounted onto a second side of the printed circuit board.

Embodiment 84 is the earpiece of any one of embodiments 72 to 83, wherein the speaker is directly soldered onto the printed circuit board.

Embodiment 85 is the earpiece of any one of embodiments 72 to 84, wherein the circuit board assembly is attached to the shell via a fastener extending through the insert.

Embodiment 86 is the earpiece of any one of embodiments 72 to 85, wherein the insert comprises a single integral mass of elastomeric material.

Embodiment 87 is the earpiece of embodiment 86, wherein the elastomeric material has a Shore A hardness of 68 or greater.

Embodiment 88 is the earpiece of embodiment 86 or 87, wherein the elastomeric material comprises silicone.

Embodiment 89 is A method for preventing microphone saturation or reducing acoustic coupling between a speaker and a microphone of an earpiece, the method comprising: emitting sound into a sound channel of the earpiece using the speaker, the sound channel forming a single pass-through cavity extending from a first end to a second end; attenuating sounds above a cut-off frequency using an acoustic channel and an acoustic chamber of the earpiece, wherein the acoustic channel extends from the sound channel to the acoustic chamber and the acoustic channel provides an acoustic path for sound around or through an acoustic barrier between the sound channel and the acoustic chamber; receiving sound in the acoustic chamber and generating an acoustic signal based on the received sound using the microphone, wherein the microphone is located in the acoustic chamber, and wherein the received sound includes sound emitted into the sound channel using the speaker.

Embodiment 90 is the method of embodiment 89, wherein attenuating sounds above the cut-off frequency comprises attenuating sounds above the cut-off frequency from the speaker to the microphone by 12 dB per octave.

Embodiment 91 is the method of embodiment 89 or 90, wherein the cut-off frequency is in a range from 500 Hz to 2000 Hz.

Embodiment 92 is the method of any one of embodiments 89 to 91, wherein the acoustic channel is formed by a groove in a shell of the earpiece, and a bottom outer surface of an insert of the earpiece.

Embodiment 93 is the method of embodiment 92, wherein the insert comprises a through hole, and wherein the speaker is received in the through hole.

Embodiment 94 is the method of embodiment 93, wherein the through hole has a longitudinal center axis that is non-orthogonal relative to a plane defined by an outer rim formed by a wall of the insert.

Embodiment 95 is the method of any one of embodiments 89 to 94, wherein the speaker comprises a first end operatively coupled with a printed circuit board of the earpiece and an opposing second end extending into the sound channel.

Embodiment 96 is the method of any one of embodiments 92 to 95, wherein the speaker is partially embedded in the insert.

Embodiment 97 is the method of any one of embodiments 89 to 96, wherein the earpiece comprises a shell comprising a first portion and a second portion coupled with the first portion, the first portion comprising the sound channel and the second portion comprising cable extension constructed to accommodate a cable extending from a circuit board assembly of the earpiece.

Embodiment 98 is the method of any one of embodiments 97, wherein the earpiece is free of an adhesive between the shell of the earpiece and the circuit board assembly.

Embodiment 99 is the method of any one of embodiments 92 to 98, wherein the insert comprises a bottom outer surface having a continuously convex surface.

Embodiment 100 is the method of any one of embodiments 97 to 99, further comprising a second microphone mounted onto a side of the circuit board assembly.

Embodiment 101 is the method of any one of embodiments 97 to 100, wherein the speaker is directly soldered onto the circuit board assembly.

Embodiment 102 is the method of any one of embodiments 97 to 101, wherein the circuit board assembly is attached to the shell via a fastener extending through the insert.

Embodiment 103 is the method of any one of embodiments 92 to 102, wherein the insert comprises a single integral mass of elastomeric material.

Embodiment 104 is the method of embodiment 103, wherein the elastomeric material has a Shore A hardness of 68 or greater.

Embodiment 105 is the method of embodiment 103 or 104, wherein the elastomeric material comprises silicone.

Embodiment 106 is the method of any one of embodiments 89 to 105, further comprising attenuating sounds above a cut-off frequency using a second acoustic chamber and a second acoustic channel in series with the acoustic chamber and acoustic channel, wherein the acoustic channel extends from the acoustic chamber to the second acoustic chamber, and the second acoustic channel extends from the second acoustic chamber to the sound channel.

Examples

These examples are merely for illustrative purposes only and are not meant to be limiting on the scope of the appended claims. All parts, percentages, ratios, etc. in the examples and the rest of the specification are by weight, unless noted otherwise. The following abbreviations are used here: m=meter; mm=millimeter; μm=micrometer; $mm^2$=square millimeter; $mm^3$=cubic millimeter.

The effect of an acoustic chamber and acoustic channel on the sound level at an in-ear microphone was simulated using LTSPICE® simulation software, available from Analog Devices, Inc., and the Knowles acoustical PSPICE library.

The simulated earpiece had a speaker connected to a sound channel and to an acoustic channel and acoustic chamber (a Helmholtz resonator). The total sound channel length was 24.04 mm (including the earpiece sound channel and eartip channel). The diameter of the sound channel ranged from 2.46 mm at the earpiece end (the end nearest the speaker) to 1 mm at the end of the eartip to represent a frustoconical sound channel. A coupler was used to represent the eardrum. Sound was measured by a microphone at the earpiece end of the sound channel and by another microphone within the acoustic chamber. The acoustic chamber volume was 71.55 $mm^3$, acoustic channel length was 10.67 mm, and acoustic channel diameter was 0.437 mm (modeling a circular cross section). The frequency was varied between 20 Hz and 20 KHz.

Figure 13A:
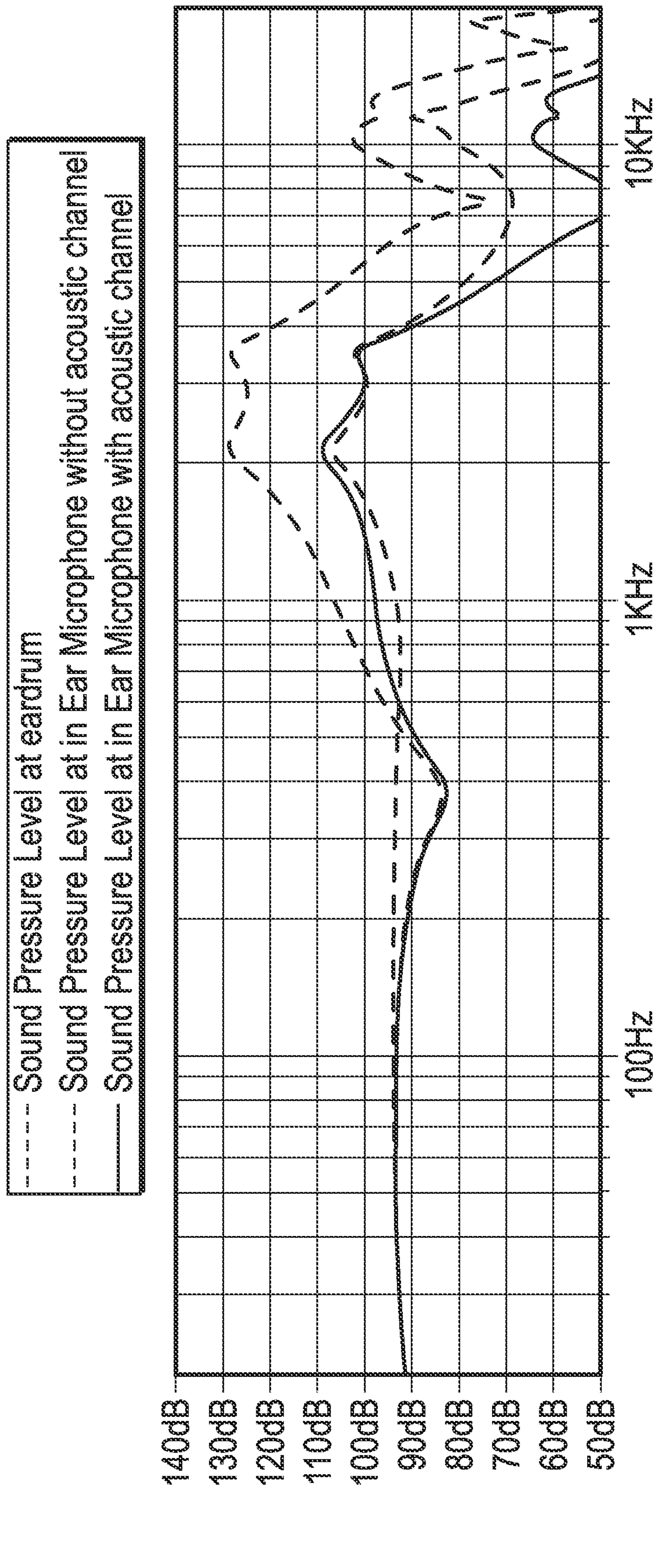
FIGS. 13A and 13B are graphical representations of the simulation in the Example.

The results are shown in FIG. 13A. The sound at the microphone at the earpiece end represents sound at an in-ear microphone without the use of an acoustic chamber and acoustic channel. The sound at the microphone within the acoustic chamber represents sound at the in-ear microphone when an acoustic chamber and acoustic channel are used to dampen sound. As can be seen from the line representing sound at the microphone at the earpiece end, the sound volume can be increased by as much as 40 dB at some frequencies. This may cause the in-ear microphone to be overloaded. On the other hand, as can be seen from the line representing the in-ear microphone in the acoustic chamber, the Helmholtz resonator can significantly dampen the sound and may be used to prevent overloading of the in-ear microphone.

Figure 13B:
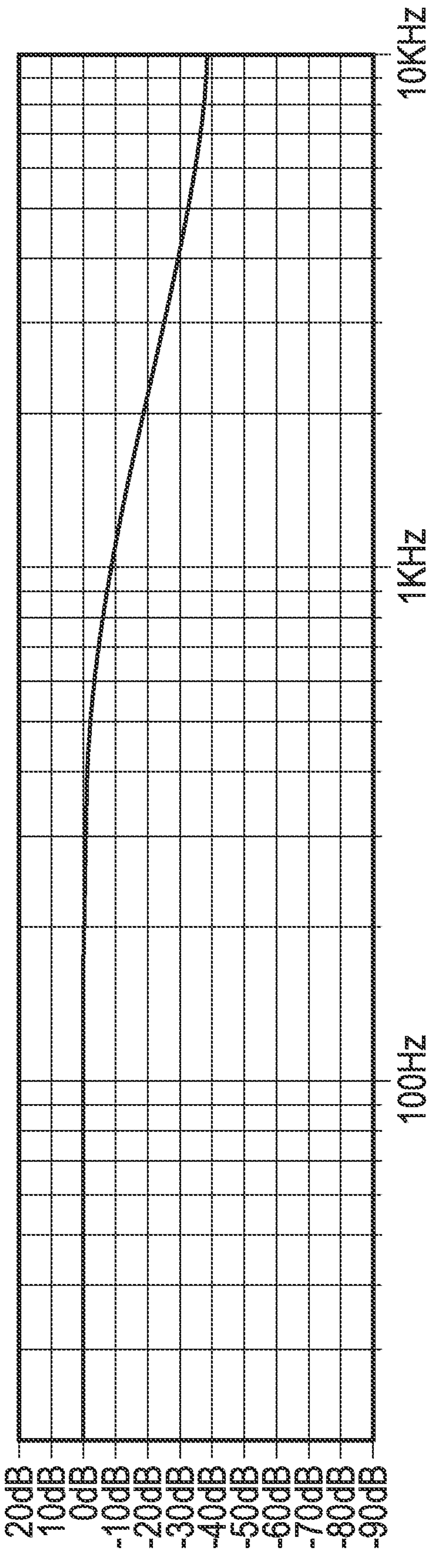

FIG. 13B shows the difference in sound pressure level achieved by the use of the acoustic channel and acoustic chamber (Helmholtz resonator).

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. An earpiece comprising:

a shell forming a cavity and a sound channel having a first end connected to and in communication with the cavity, and a second end opposite to the first end, the sound channel forming a single pass-through cavity extending from the first end to the second end;

an insert disposed within the cavity, wherein the insert comprises a through hole;

a speaker, wherein the speaker is received in the through hole, wherein the through hole has a longitudinal center axis that is non-orthogonal relative to a plane defined by an outer rim formed by a wall of the insert;

a circuit board assembly mounted onto the insert, the circuit board assembly comprising a printed circuit board defining a first side and a second side, and a first microphone disposed on the first side;

an acoustic chamber formed between the insert and the circuit board assembly, the first microphone being disposed within the acoustic chamber; and an acoustic channel extending from the acoustic chamber, the acoustic channel being in communication with the sound channel.

2. The earpiece of claim 1, wherein the insert acoustically isolates the speaker from the first microphone.

3. The earpiece of claim 1, wherein the acoustic channel is formed by a groove in the shell, and a bottom outer surface of the insert.

4. The earpiece of claim 1, further comprising a second acoustic chamber and a second acoustic channel in series with the acoustic chamber and acoustic channel, wherein the acoustic channel extends from the acoustic chamber to the second acoustic chamber, and the second acoustic channel extends from the second acoustic chamber to the sound channel.

5. A method for preventing microphone saturation or reducing acoustic coupling between a speaker and a microphone of an earpiece, the method comprising:

emitting sound into a sound channel of the earpiece using the speaker, the sound channel forming a single pass-through cavity extending from a first end to a second end;

attenuating sounds above a cut-off frequency using an acoustic channel and an acoustic chamber of the earpiece, wherein the acoustic channel extends from the sound channel to the acoustic chamber and the acoustic channel provides an acoustic path for sound around or through an acoustic barrier between the sound channel and the acoustic chamber;

receiving sound in the acoustic chamber and generating an acoustic signal based on the received sound using the microphone, wherein the microphone is located in the acoustic chamber, and wherein the received sound includes sound emitted into the sound channel using the speaker, and wherein the insert comprises a through hole, and wherein the speaker is received in the through hole, wherein the through hole has a longitudinal center axis that is non-orthogonal relative to a plane defined by an outer rim formed by a wall of the insert.

6. The method of claim 5, further comprising an insert disposed within a shell of the earpiece and a circuit board assembly comprising a printed circuit board and mounted onto the insert, wherein the acoustic chamber is formed between the insert and the circuit board assembly, and wherein the microphone is disposed on a first surface of the printed circuit board, wherein the insert acoustically isolates the speaker from the first microphone.

7. The method of claim 5, wherein the speaker comprises a first end operatively coupled with a printed circuit board of the earpiece and an opposing second end extending into the sound channel.

8. The method of claim 6, wherein the speaker is partially embedded in the insert.

9. The method of claim 6, wherein the insert comprises a single integral mass of elastomeric material, wherein the elastomeric material has a Shore A hardness of 65 or greater, wherein the elastomeric material comprises silicone.

10. The method of claim 6, further comprising attenuating sounds above a second cut-off frequency using a second acoustic chamber and a second acoustic channel in series with the acoustic chamber and acoustic channel, wherein the acoustic channel extends from the acoustic chamber to the second acoustic chamber, and the second acoustic channel extends from the second acoustic chamber to the sound channel.

11. The earpiece of claim 1, wherein the acoustic channel being configured to reduce sounds above a cut-off frequency from the speaker to the microphone by 12 dB or more per octave.

12. The earpiece of claim 11, wherein the cut-off frequency is from 500 Hz to 2000 Hz.

13. The earpiece of claim 1, wherein the insert comprises a single integral mass of elastomeric material, wherein the elastomeric material has a Shore A hardness of 65 or greater, wherein the elastomeric material comprises silicone.

14. An earpiece comprising:

a shell forming a cavity and a sound channel having a first end connected to and in communication with the cavity, and a second end opposite to the first end, the sound channel forming a single pass-through cavity extending from the first end to the second end;

an insert disposed within the cavity;

a speaker;

a circuit board assembly mounted onto the insert, the circuit board assembly comprising a printed circuit board defining a first side and a second side, and a first microphone disposed on the first side;

an acoustic chamber formed between the insert and the circuit board assembly, the first microphone being disposed within the acoustic chamber;

an acoustic channel extending from the acoustic chamber, the acoustic channel being in communication with the sound channel; and a second acoustic chamber and a second acoustic channel in series with the acoustic chamber and acoustic channel, wherein the acoustic channel extends from the acoustic chamber to the second acoustic chamber, and the second acoustic channel extends from the second acoustic chamber to the sound channel.

15. The earpiece of claim 14, wherein the insert acoustically isolates the speaker from the first microphone.

16. The earpiece of claim 14, wherein the speaker is partially embedded in the insert.

17. The earpiece of claim 14, wherein the insert comprises a single integral mass of elastomeric material, wherein the elastomeric material has a Shore A hardness of 65 or greater, wherein the elastomeric material comprises silicone.

* * * * *